(12) United States Patent
Guo et al.

(10) Patent No.: US 12,436,279 B2
(45) Date of Patent: Oct. 7, 2025

(54) ULTRASOUND IMAGING METHOD AND ULTRASOUND IMAGING SYSTEM

(71) Applicant: SHENZHEN MINDRAY BIO-MEDICAL ELECTRONICS CO., LTD., Guangdong (CN)

(72) Inventors: Chongchong Guo, Shenzhen (CN); Jing Liu, Shenzhen (CN)

(73) Assignee: Shenzhen Mindray Bio-Medical Electronics Co., Ltd., Shenzhen (CN)

( * ) Notice: Subject to any disclaimer, the term of this patent is extended or adjusted under 35 U.S.C. 154(b) by 164 days.

(21) Appl. No.: 18/498,754

(22) Filed: Oct. 31, 2023

(65) Prior Publication Data
US 2024/0142620 A1    May 2, 2024

(30) Foreign Application Priority Data

Oct. 31, 2022  (CN) .......................... 202211351219.7

(51) Int. Cl.
*A61B 8/14*     (2006.01)
*G01S 15/89*    (2006.01)

(52) U.S. Cl.
CPC ............ *G01S 15/8995* (2013.01); *A61B 8/14* (2013.01)

(58) Field of Classification Search
CPC ......... A61B 8/0891; A61B 8/14; A61B 8/467; A61B 8/488; A61B 8/5207; A61B 8/5253; G01S 15/8995
See application file for complete search history.

(56) References Cited

U.S. PATENT DOCUMENTS

| 11,087,466 B2 | 8/2021 | Vignon et al. |
| 2003/0092989 A1* | 5/2003 | Aichhorn ............ G01S 7/52085 600/443 |

(Continued)

FOREIGN PATENT DOCUMENTS

| CN | 110800019 A | 2/2020 |
| WO | 2022/082627 A1 | 4/2022 |

OTHER PUBLICATIONS

First Office Action and Search Report dated Feb. 27, 2025, issued in related Chinese Patent Application No. 202211351219.7, with English machine translation (11 pages).

*Primary Examiner* — Mark D Remaly
(74) *Attorney, Agent, or Firm* — Sheppard Mullin Richter & Hampton LLP

(57) ABSTRACT

An ultrasound imaging method includes: transmitting ultrasound waves to a target tissue at least three different transmission angles, where the ultrasound waves at least two transmission angles have different transmitting frequencies, and the ultrasound waves at least two transmission angles have the same transmitting frequency; for an ultrasound echo signal corresponding to each transmission angle, performing beamforming at least two different receiving angles; performing at least one coherent compounding and at least one non-coherent compounding on beamformed data to obtain compounded data, where each coherent compounding includes performing coherent compounding on beamformed data corresponding to the same receiving angle, the same transmitting frequency, and different transmission angles; and the non-coherent compounding includes performing non-coherent compounding on at least one set of coherently compounded data and beamformed data not subjected to the coherent compounding; and generating an ultrasound image based on the compounded data.

18 Claims, 11 Drawing Sheets

(56) References Cited

U.S. PATENT DOCUMENTS

| | | |
|---|---|---|
| 2003/0149357 A1 | 8/2003 | Liu |
| 2004/0127795 A1 | 7/2004 | Lin et al. |
| 2006/0241454 A1 | 10/2006 | Ustuner et al. |
| 2006/0293596 A1 | 12/2006 | Jago et al. |
| 2009/0036772 A1 | 2/2009 | Lu |
| 2022/0249064 A1 | 8/2022 | Huang et al. |

\* cited by examiner

ULTRASOUND IMAGING METHOD AND ULTRASOUND IMAGING SYSTEM

CROSS-REFERENCE TO RELATED APPLICATIONS

This application is based on and claims priority to and benefits of Chinese Patent Application No. 202211351219.7, filed on Oct. 31, 2022. The entire content of the above-referenced application is incorporated herein by reference.

TECHNICAL FIELD

The disclosure relates to the technical field of ultrasound imaging, and more specifically, to an ultrasound imaging method and an ultrasound imaging system.

BACKGROUND

Ultrasound imaging refers to the use of an ultrasound probe to transmit an ultrasound wave to a subject under examination or diagnosis, and then generate an ultrasound image based on an echo signal of the ultrasound wave. Ultrasound imaging has advantages such as real-time imaging, no radiation, wide audience, and low cost, and has been widely used in medical clinical diagnosis and routine physical examinations. The quality of an ultrasound image is crucial for clinical diagnosis.

Ultrasound imaging originates from the transmission of ultrasound waves. One of the most important parameters of ultrasound waves is a transmitting frequency. Due to different absorption and scattering of ultrasound waves of different frequencies by a human tissue, different transmitting frequencies have different effects on ultrasound images. Generally, a higher frequency indicates a better spatial resolution and a better contrast resolution of an ultrasound image, but it also indicates a stronger attenuation of propagation in the human tissue. As a result, an ultrasound wave of a higher frequency has a poorer penetration capability. A lower frequency indicates a better penetration capability of an ultrasound wave, but it also indicates a worse spatial resolution. It can be simply understood that a frequency is positively correlated with a spatial resolution of an ultrasound image, but is negatively correlated with a penetration capability of an ultrasound wave. It is difficult to balance the spatial resolution and the penetration capability.

SUMMARY

In the summary part, a series of concepts in simplified form are introduced, and will be further explained in detail in the part of description of the preferred embodiments. The summary of the disclosure does not mean trying to define key features and necessary technical features of the claimed technical solutions, let alone trying to determine the scope of protection of the claimed technical solutions.

A first aspect of an embodiment of the disclosure provides an ultrasound imaging method, the method including:
transmitting ultrasound waves to a target tissue of a subject at least three different transmission angles, where the ultrasound waves at least two transmission angles have different transmitting frequencies, and the ultrasound waves at least two transmission angles have a same transmitting frequency;
receiving an echo of the ultrasound wave at each transmission angle to obtain an ultrasound echo signal corresponding to each transmission angle;
for the ultrasound echo signal corresponding to each transmission angle, performing beamforming at least two different receiving angles to obtain beamformed data corresponding to the different receiving angles;
based on each transmission angle, the receiving angles, and a transmitting frequency corresponding to the beamformed data, performing at least one coherent compounding and at least one non-coherent compounding on the beamformed data to obtain compounded data, where each coherent compounding includes performing coherent compounding on beamformed data corresponding to the same receiving angle, the same transmitting frequency, and different transmission angles to obtain a set of coherently compounded data corresponding to a same receiving angle and the same transmitting frequency, and each non-coherent compounding includes performing non-coherent compounding on at least one set of coherently compounded data and beamformed data not subjected to the coherent compounding; and
generating an ultrasound image based on the compounded data.

A second aspect of an embodiment of the disclosure provides an ultrasound imaging method, the method including:
transmitting ultrasound waves to a target tissue of a subject at least three different transmission angles, where the ultrasound waves at least two transmission angles have different transmitting frequencies, and the ultrasound waves at least two transmission angles have a same transmitting frequency;
receiving an echo of the ultrasound wave at each transmission angle to obtain an ultrasound echo signal corresponding to each transmission angle;
for the ultrasound echo signal corresponding to each transmission angle, performing beamforming at least two different receiving angles to obtain beamformed data corresponding to the different receiving angles;
based on each transmission angle, the receiving angles, and a transmitting frequency corresponding to the beamformed data, performing at least one coherent compounding and at least one non-coherent compounding on the beamformed data to obtain compounded data, where each coherent compounding includes performing coherent compounding on beamformed data corresponding to a same receiving angle, the same transmitting frequency, and different transmission angles to obtain a set of coherently compounded data corresponding to the same receiving angle and the same transmitting frequency, and each non-coherent compounding includes performing non-coherent compounding on at least two sets of coherently compounded data; and
generating an ultrasound image based on the compounded data.

A third aspect of an embodiment of the disclosure provides an ultrasound imaging method, the method including:
transmitting ultrasound waves to a target tissue of a subject at least two different transmission angles, where the ultrasound waves at least two transmission angles have different transmitting frequencies;
receiving an echo of the ultrasound wave at each transmission angle to obtain an ultrasound echo signal corresponding to each transmission angle;
for the ultrasound echo signal corresponding to each transmission angle, performing beamforming at least two different receiving angles to obtain beamformed data corresponding to the different receiving angles;

based on each transmission angle, the receiving angles, and a transmitting frequency corresponding to the beamformed data, performing at least one coherent compounding and at least one non-coherent compounding on the beamformed data to obtain compounded data, where each coherent compounding includes performing coherent compounding on beamformed data corresponding to a same transmission angle, a same transmitting frequency, and different receiving angles to obtain a set of coherently compounded data corresponding to the same transmission angle and the same transmitting frequency, and each non-coherent compounding includes performing non-coherent compounding on at least two sets of coherently compounded data; and generating an ultrasound image based on the compounded data.

A fourth aspect of an embodiment of the disclosure provides an ultrasound imaging method, the method including:

transmitting ultrasound waves to a target tissue of a subject at least two different transmission angles, where the ultrasound waves at least two transmission angles have different transmitting frequencies;

receiving an echo of the ultrasound wave at each transmission angle to obtain an ultrasound echo signal corresponding to each transmission angle;

for the ultrasound echo signal corresponding to each transmission angle, performing beamforming at least two different receiving angles to obtain beamformed data corresponding to the different receiving angles;

based on each transmission angle, the receiving angles, and a transmitting frequency corresponding to the beamformed data, performing at least one coherent compounding and at least one non-coherent compounding on the beamformed data to obtain compounded data, where each coherent compounding includes performing coherent compounding on beamformed data corresponding to a same transmission angle, a same transmitting frequency, and different receiving angles to obtain a set of coherently compounded data corresponding to the same transmission angle and the same transmitting frequency, and each non-coherent compounding includes performing non-coherent compounding on at least one set of coherently compounded data and beamformed data not subjected to the coherent compounding; and generating an ultrasound image based on the compounded data.

A fifth aspect of an embodiment of the disclosure provides an ultrasound imaging system, including:

an ultrasound probe;

a transmitter circuit configured to excite the ultrasound probe to transmit an ultrasound wave to a target tissue;

a receiver circuit configured to control the ultrasound probe to receive an ultrasound echo signal of the ultrasound wave;

a processor configured to perform the ultrasound imaging method as described above, to generate an ultrasound image; and a display configured to display the ultrasound image.

According to the ultrasound imaging method and the ultrasound imaging system in the embodiments of the disclosure, different transmitting frequencies are used when ultrasound waves are transmitted at different transmission angles, beamforming processing is performed on at least two different receiving angles for each transmission angle, then coherent compounding and non-coherent compounding are performed on beamformed data to obtain compounded data, and an ultrasound image is generated based on the compounded data, where the coherent compounding is performed on beamformed data corresponding to the same transmitting frequency, the same receiving angle, and different transmission angles, or the coherent compounding is performed on beamformed data corresponding to the same transmitting frequency, the same transmission angle, and different receiving angles. In this way, the compounded image can include information about a plurality of frequencies without requiring exactly all transmitting frequencies to be used for transmission at each transmission angle, and a spatial resolution, a penetration capability, and a temporal resolution of the compounded image can be ensured without reducing a frame rate; in a compounding process, both coherent compounding and non-coherent compounding are performed, and phase information and amplitude information of data are combined; and coherent compounding is performed between data corresponding to the same transmission angle or the same receiving angle and the same transmitting frequency, which reduces the difficulty of a compounding algorithm.

BRIEF DESCRIPTION OF THE DRAWINGS

The above and other objects, features and advantages of the disclosure will become more apparent from the description of embodiments of the disclosure in detail with reference to the accompanying drawings. The accompanying drawings, which are intended to provide a further understanding of embodiments of the disclosure and constitute a part of this specification, are intended to explain the disclosure together with the embodiments of the disclosure and not to limit the disclosure. In the accompanying drawings, like reference numerals generally indicate like components or steps.

DESCRIPTION OF THE PREFERRED EMBODIMENTS

In order to make the objects, technical solutions, and advantages of the disclosure more apparent, the example embodiments according to the disclosure will be described in detail below with reference to the accompanying drawings. Apparently, the embodiments described are merely some, rather than all, of the embodiments of the disclosure. It should be understood that the disclosure is not limited by the example embodiments described herein. All other embodiments derived by those skilled in the art without creative efforts on the basis of the embodiments of the disclosure described in the disclosure shall fall within the scope of protection of the disclosure.

In the following description, a large number of specific details are given to provide a more thorough understanding of the disclosure. However, it is obvious to those skilled in the art that the disclosure can be implemented without one or more of these details. In other examples, some well-known technical features in the art are not described in order to avoid obscuring the disclosure.

It should be understood that, the disclosure can be implemented in different forms and should not be construed as being limited to the embodiments presented herein. On the contrary, these embodiments are provided to make the disclosure thorough and complete, and to fully convey the scope of the disclosure to those skilled in the art.

The terms used herein are intended only to describe specific embodiments and do not constitute a limitation to the disclosure. As used herein, the singular forms of "a", "an", and "the/this" are also intended to include plural forms, unless the context clearly indicates otherwise. It should also be appreciated that the terms "composed of" and/or "including", when used in the description, determine the existence of described features, integers, steps, operations, elements, and/or components, but do not exclude the existence or addition of one or more other features, integers, steps, operations, elements, components, and/or groups thereof. As used herein, the term "and/or" includes any and all combinations of relevant listed items.

For a thorough understanding of the disclosure, a detailed structure will be proposed in the following description to explain the technical solutions proposed in the disclosure. The optional embodiments of the disclosure are described in detail as follows. However, the disclosure may also have other implementations in addition to these detailed descriptions.

Figure 1:
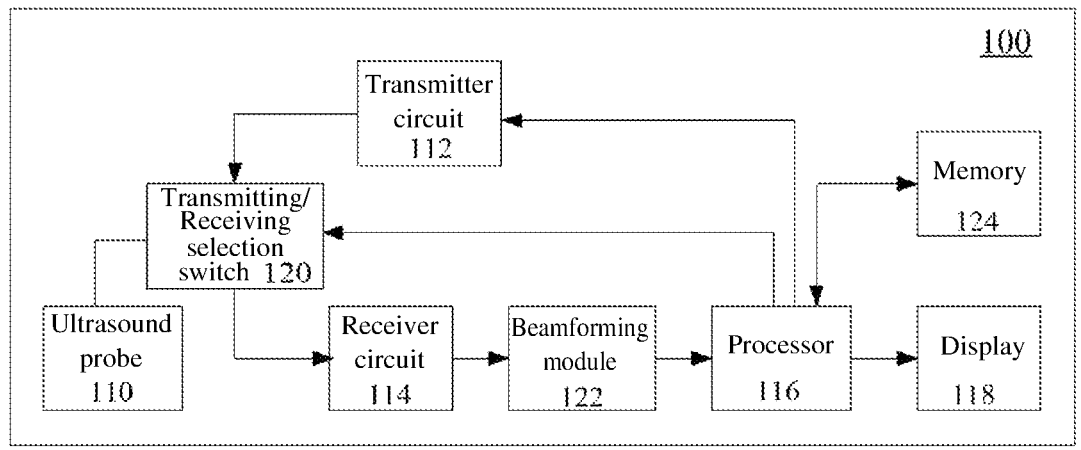
FIG. 1 is a block diagram of a structure of an ultrasound imaging system according to an embodiment of the disclosure.

In the following, first, an ultrasound imaging system according to an embodiment of the disclosure is described with reference to FIG. 1. FIG. 1 is a block diagram of a schematic structure of an ultrasound imaging system 100 according to an embodiment of the disclosure.

As shown in FIG. 1, the ultrasound imaging system 100 includes an ultrasound probe 110, a transmitter circuit 112, a receiver circuit 114, a processor 116, and a display 118. Further, the ultrasound imaging system may further include a transmitting/receiving selection switch 120 and a beamforming module 122, and the transmitter circuit 112 and the receiver circuit 114 may be connected to the ultrasound probe 110 through the transmitting/receiving selection switch 120.

The ultrasound probe 110 includes a plurality of transducer array elements. The plurality of transducer array elements may be arranged into a row to form a linear array, or arranged into a two-dimensional matrix to form an area array. Alternatively, the plurality of transducer array elements may form a convex array. The transducer array element is configured to transmit an ultrasound wave based on an excitation electrical signal, or convert a received ultrasound wave into an electrical signal. Therefore, each transducer array element may be configured to implement mutual conversion of an electrical pulse signal and an ultrasound wave, so as to transmit an ultrasound wave to a tissue in a target region of a subject, or may be configured to receive an echo of the ultrasound wave that is reflected by the tissue.

During ultrasound imaging, a transmitting sequence and a receiving sequence may be used to control which transducer array elements are used to transmit an ultrasound wave and which transducer array elements are used to receive an ultrasound wave, or control the transducer array elements to be used to transmit an ultrasound wave or receive an echo of the ultrasound wave in different slots. The transducer array elements participating in transmission of the ultrasound wave can be simultaneously excited by the electrical signal, so as to simultaneously transmit the ultrasound wave; or the transducer array elements participating in transmission of the ultrasound wave may be excited by several electrical signals having a specific time interval, so as to continuously transmit ultrasound waves having a specific time interval.

In an ultrasound imaging process, the transmitter circuit 112 generates a transmitting sequence under control of the processor 116. The transmitting sequence is used to control some or all of the plurality of transducer array elements to transmit an ultrasound wave to a target tissue. Parameters of the transmitting sequence include positions of the transmitting transducer array elements, the number of the transducer array elements, and transmission parameters of an ultrasound beam, such as amplitude, frequency, times of transmissions, transmission interval, transmission angle, waveform, and focusing position. In some cases, the transmitter circuit 112 is further configured to delay a phase of a transmitted beam, such that different transducer array elements transmit ultrasound waves at different moments, and ultrasound beams transmitted can be focused in a predetermined region of interest. Parameters of the transmitting sequence corresponding to different imaging modes may be different. After an ultrasound echo signal is received by the receiver circuit 114 and processed by a subsequent module and corresponding algorithm, ultrasound images of different imaging modes may be generated.

The receiver circuit 114 may include one or more amplifiers, analog-to-digital converters, and the like. The amplifier is configured to amplify the received ultrasound echo signal after proper gain compensation. The analog-to-digital converter is configured to sample an analog echo signal at predetermined time intervals, so as to convert same into a digitalized signal. The digitalized echo signal still retains amplitude information, frequency information, and phase information. The receiver circuit 114 sends the ultrasound echo signal to the beamforming module 122 for processing.

The beamforming module 122 performs processing such as focusing delaying, weighting, and channel summation on the ultrasound echo signals, and then sends the ultrasound echo signals to the processor 116. The processor 116 performs signal detection, signal enhancement, data conversion, logarithmic compression, and other processing on the ultrasound echo signals to form an ultrasound image. The ultrasound image obtained by the processor 116 may be displayed on the display 118 or stored in a memory 124.

Optionally, the processor 116 may be implemented by software, hardware, firmware, or any combination thereof, and may use one or more application specific integrated circuits (ASICs), one or more universal integrated circuits, one or more microprocessors, one or more programmable logic devices, or a combination of the above circuits or devices, or other suitable circuits or devices. Moreover, the processor 116 can control other components in the ultrasound imaging system 100 to perform corresponding steps of the methods in the various embodiments in this specification.

The display 118 is connected to the processor 116, and the display 118 may be a touchscreen display, a liquid crystal display, or the like; or the display 118 may be an independent display such as a liquid crystal display or a television independent of the ultrasound imaging system 100; or the display 118 may be a display of an electronic device such as a smartphone or a tablet computer. There may be one or more displays 118.

The display 118 may display the ultrasound image obtained by the processor 116. In addition, the display 118 may further provide a user with a graphical interface to perform human-machine interaction while displaying an ultrasound image, set one or more controlled objects on the graphical interface, and provide the user with a human-machine interaction apparatus to input operation instructions to control these controlled objects, so as to perform corresponding control operations. For example, an icon is displayed on the graphical interface, and the human-machine interaction apparatus may be used to operate the icon to perform a specific function, for example, drawing a box of a region of interest on the ultrasound image.

Optionally, the ultrasound imaging system 100 may alternatively include another human-machine interaction apparatus other than the display 118 that is connected to the processor 116. For example, the processor 116 may be connected to the human-machine interaction apparatus through an external input/output port, and the external input/output port may be a wireless communications module, or a wired communications module, or a combination of both. The external input/output port may be alternatively implemented based on a USB, a bus protocol such as CAN, and/or a wired network protocol.

The human-machine interaction apparatus may include an input device configured to detect input information of a user. The input information may be, for example, a control instruction for a time sequence of transmitting/receiving ultrasound waves, or an operation input instruction of drawing a point, a line, or a box on the ultrasound image or the like, or may include another type of instruction. The input device may include one or a combination of a keyboard, a mouse, a rolling wheel, a trackball, a mobile input device (such as a mobile device with a touchscreen display or a mobile phone), a multi-function knob, and the like. The human-machine interaction apparatus may further include an output device such as a printer.

The ultrasound imaging system 100 may further include a memory 124 for storing instructions executed by the processor, received ultrasound echoes, ultrasound images, and the like. The memory may be a flash memory card, a solid state memory, a hard disk, or the like. The memory may be a volatile memory and/or a non-volatile memory, a removable memory and/or a non-removable memory, or the like.

It should be understood that the components included in the ultrasound imaging system 100 shown in FIG. 1 are only schematic, and more or fewer components may be included. This is not limited in the disclosure.

Figure 2:
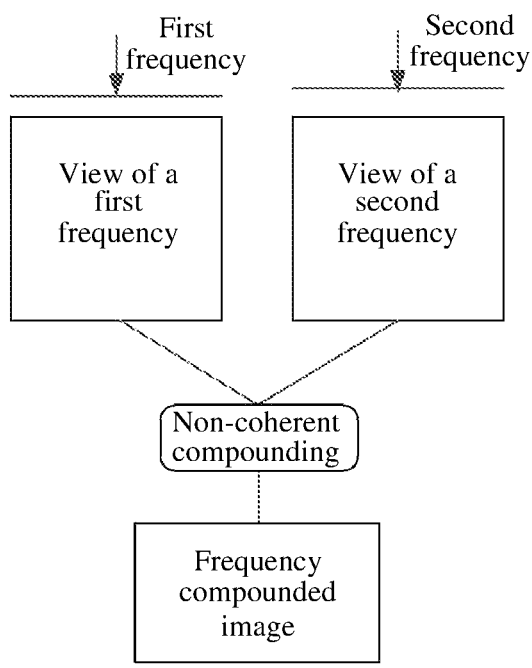
FIG. 2 is a schematic diagram of frequency compounding.

Because a frequency is positively correlated with a spatial resolution of an ultrasound image, but is negatively correlated with a penetration capability of an ultrasound wave, an ultrasound imaging method is to separately transmit a low-frequency ultrasound wave and a high-frequency ultrasound wave, and then perform non-coherent compounding, that is, frequency compounding, on views obtained at the two types of frequencies, as shown in FIG. 2. Such compound imaging may not only take into account the spatial resolution of the image, but also take into account the penetration capability, so that the image quality may be improved. However, due to the need to separately transmit an ultrasound wave at two different frequencies, the number of transmissions is doubled, which reduces a frame rate and a temporal resolution of an ultrasound image, and affects the real-time imaging of moving tissues in the heart, blood flow, and the like.

Figure 3:
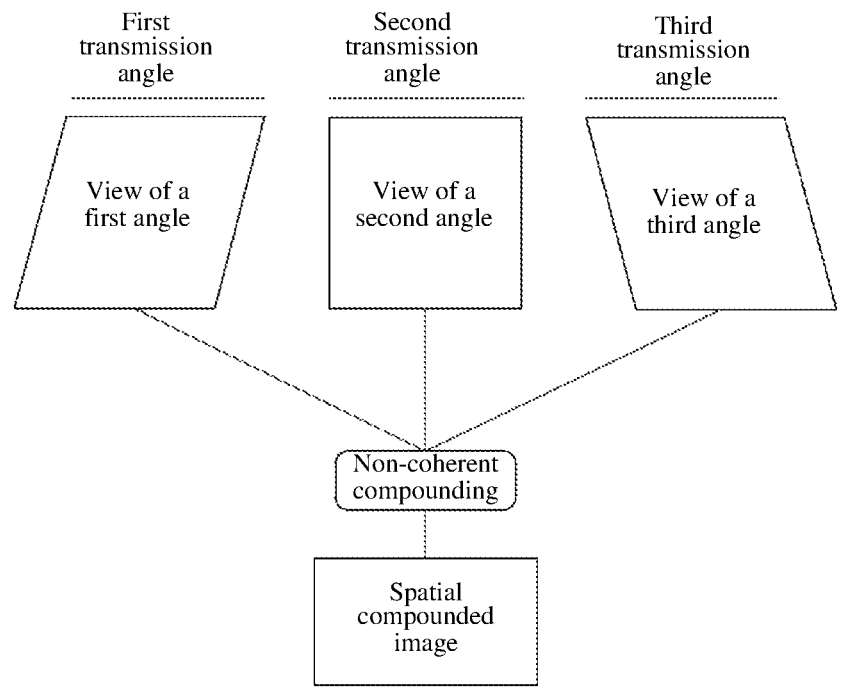
FIG. 3 is a schematic diagram of spatial compounding.

Spatial compounding is to transmit an ultrasound wave at different angles to form image data at different angles, and then perform non-coherent compounding, as shown in FIG. 3. This compounding imaging technology can reduce the variance of speckle noise in ultrasound imaging and reduce the noise. If frequency compounding and spatial compounding are combined, that is, a low-frequency ultrasound wave and a high-frequency ultrasound wave are transmitted at each transmission angle, the quality of an ultrasound image can be improved, but the temporal resolution of the ultrasound image will be greatly reduced, resulting in a poor dynamic sense. In actual use, a user needs to make, according to different scenarios, a choice between a temporal resolution of an ultrasound image and a spatial resolution and a penetration capability of an ultrasound image, and the two often cannot be ensured at the same time.

Figure 4:
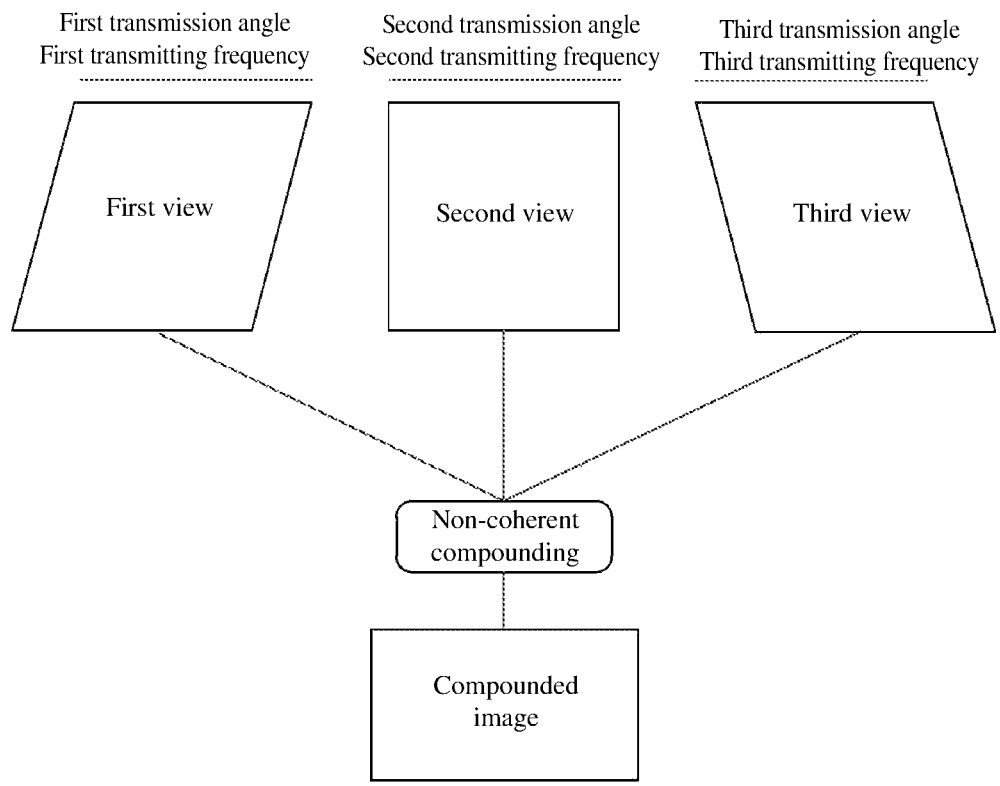
FIG. 4 is a schematic diagram of frequency and spatial compounding.

To apply frequency compounding and spatial compounding at the same time, a compromise solution is to transmit ultrasound waves at a plurality of transmission angles, and different transmitting frequencies are used for different transmission angles, as shown in FIG. 4. In the example of FIG. 4, ultrasound waves are transmitted using three transmission angles and two types of frequencies, and then views of different transmission angles and transmitting frequencies are non-coherently compounded, and a compounded image obtained finally combines angle information and frequency information, so that a temporal resolution and a spatial resolution are balanced to a certain extent. However, the three views in FIG. 4 are relatively independent, and the angle information and the frequency information included in each view are different. It requires an extremely complex compounding algorithm during compounding, and cannot achieve an image effect in which views of two types of frequencies are included for each angle.

For this reason, an embodiment of the disclosure proposes a new frequency-spatial compounding imaging method, different transmitting frequencies are used when ultrasound waves are transmitted at different transmission angles, beamforming processing is performed at least two different receiving angles for each transmission angle, then coherent compounding and non-coherent compounding are performed on beamformed data to obtain compounded data, and an ultrasound image is generated based on the compounded data, where the coherent compounding is performed on beamformed data corresponding to the same transmitting frequency, the same receiving angle, and different transmission angles, or the coherent compounding is performed on beamformed data corresponding to the same transmitting frequency, the same transmission angle, and different receiving angles. In this way, the compounded image can include information about a plurality of frequencies without requiring exactly all transmitting frequencies to be used for transmission at each transmission angle, and a spatial resolution, a penetration capability, and a temporal resolution of the compounded image can be ensured without reducing a frame rate; in a compounding process, both coherent compounding and non-coherent compounding are performed, and phase information and amplitude information of data are combined; and coherent compounding is performed between data corresponding to the same transmission angle or the same receiving angle and the same transmitting frequency, which reduces the difficulty of a compounding algorithm.

Figure 5:
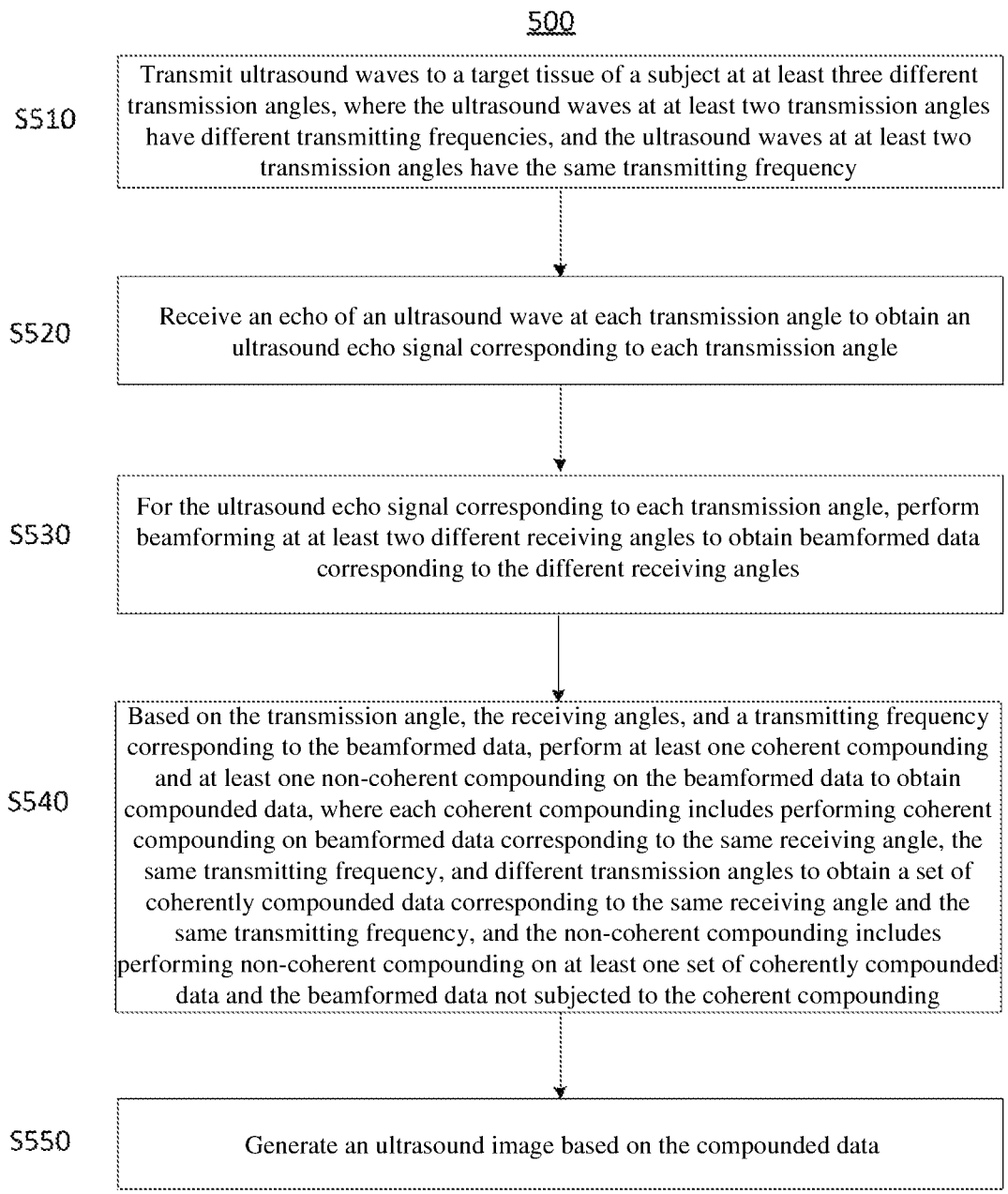
FIG. 5 is a schematic flowchart of an ultrasound imaging method according to an embodiment of the disclosure.

In the following, first, an ultrasound imaging method according to an embodiment of the disclosure is described with reference to FIG. 5. FIG. 5 is a schematic flowchart of an ultrasound imaging method 500 according to an embodiment of the disclosure. As shown in FIG. 5, the ultrasound imaging method 500 according to one embodiment of the disclosure includes the following steps.

In step S510, ultrasound waves are transmitted to a target tissue of a subject at least three different transmission angles, where the ultrasound waves at least two transmission angles have different transmitting frequencies, and the ultrasound waves at least two transmission angles have the same transmitting frequency.

In step S520, an echo of an ultrasound wave is received at each transmission angle to obtain an ultrasound echo signal corresponding to each transmission angle.

In step S530, for the ultrasound echo signal corresponding to each transmission angle, beamforming is performed at least two different receiving angles to obtain beamformed data corresponding to the different receiving angles.

In step S540, based on the transmission angle, the receiving angles, and a transmitting frequency corresponding to the beamformed data, at least one coherent compounding and at least one non-coherent compounding are performed on the beamformed data to obtain compounded data, where each coherent compounding includes performing coherent compounding on beamformed data corresponding to the same receiving angle, the same transmitting frequency, and different transmission angles to obtain a set of coherently compounded data corresponding to the same receiving angle and the same transmitting frequency, and the non-coherent compounding includes performing non-coherent compounding on at least one set of coherently compounded data and the beamformed data not subjected to the coherent compounding.

In step S550, an ultrasound image is generated based on the compounded data.

This embodiment of the disclosure relates to an ultrasound frequency compounding technology and an ultrasound spatial compounding technology. Herein, the frequency compounding makes an ultrasound image include information about different frequencies, low-frequency information can provide a high penetration capability, and high-frequency information can provide a high spatial resolution, so that a spatial resolution and a penetration capability of an ultrasound image are balanced, and the image quality is improved. The spatial compounding can reduce speckle noise formed by ultrasound imaging, reduce a generated speckle variance, increase the visibility of edges of the scatterer or boundaries of the tissue, and improve the image quality. In addition, because interfaces in different directions can be detected through scanning at different transmission angles, when an interface of the tissue is a curved surface, since different parts of the curved surface are imaged at different deflection angles, the continuity of the curved surface can be improved after spatial compounding.

The ultrasound imaging method of this embodiment of the disclosure can be used for grayscale imaging, or may be applied to a Doppler imaging mode and other imaging modes; or spatially, the method may be applied to conventional two-dimensional ultrasound imaging, or may be applied to three-dimensional ultrasound imaging or four-dimensional ultrasound imaging.

Specifically, in step S510, an ultrasound probe is controlled to transmit ultrasound waves at different transmission angles in sequence. The ultrasound waves at least two transmission angles have different transmitting frequencies, and the ultrasound waves at least two transmission angles have the same transmitting frequency. Different transmitting frequencies are used for at least two transmission angles to combine different frequency information during spatial compounding while implementing frequency compounding. The same transmitting frequency is used for at least two transmission angles so that the same receiving angle may correspond to the same transmitting frequency, so as to facilitate coherent compounding of beamformed data corresponding to the same receiving angle, different transmission angles, and the same transmitting frequency.

Figure 6:
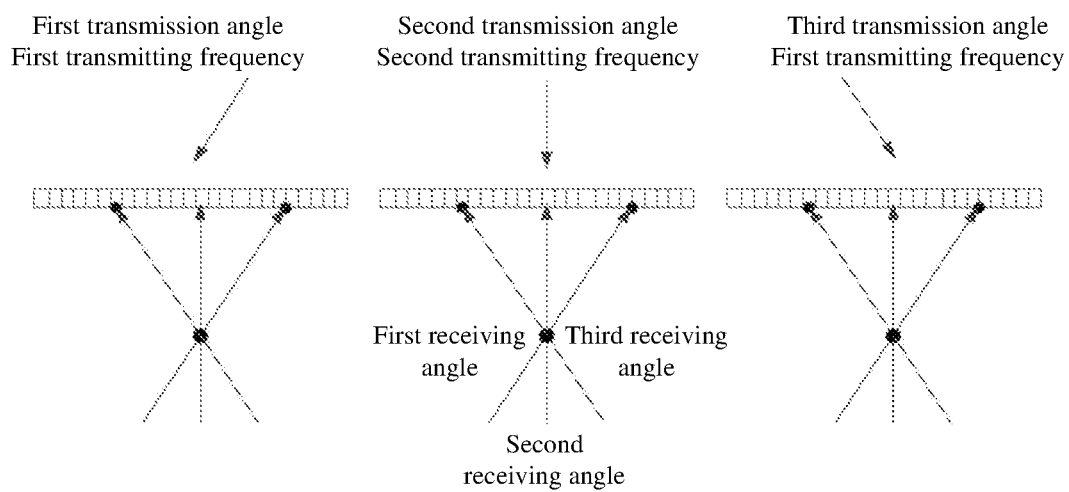
FIG. 6 is a schematic diagram of one transmission angle corresponding to a plurality of receiving angles according to an embodiment of the disclosure.

For example, in an example of FIG. 6, a transmission angle of an ultrasound wave includes a first transmission angle, a second transmission angle, and a third transmission angle that respectively correspond to a first transmitting frequency, a second transmitting frequency, and the first transmitting frequency, where the first transmission angle and the second transmission angle have different transmitting frequencies, the second transmission angle and the third transmission angle have different transmitting frequencies, and the first transmission angle and the third transmission angle have the same transmitting frequency.

The different transmitting frequencies may refer to different fundamental frequencies, or different harmonic frequencies, or a combination of fundamental frequencies and harmonic frequencies; and receiving corresponding to each transmitting frequency is receiving corresponding to the frequency.

The ultrasound probe that transmits the ultrasound waves may be any type of ultrasound probe such as a linear array probe, a convex array probe, a planar array probe, or a phased array probe. The ultrasound waves transmitted by the ultrasound probe may be focused ultrasound waves or non-focused ultrasound waves. Different transmission angles are achieved through different transmission delays, while the relative position of the ultrasound probe and the tissue remains unchanged. In some embodiments, the transmission angles of the ultrasound wave include a vertical transmission angle perpendicular to a plane where an array element that transmits the ultrasound wave is located and at least two deflected transmission angles that are symmetrical to each other with respect to the vertical transmission angle. Deflected transmission angles that are symmetrical to each other with respect to the same vertical transmission angle have the same transmitting frequency, and a transmitting frequency of the vertical transmission angle is different from a transmitting frequency of a deflected transmission angle.

Exemplarily, if the transmitted ultrasound waves are focused ultrasound waves, a plurality of transducer array elements of the ultrasound probe are controlled to focus ultrasound beams in a target position, such that a better image resolution and contrast can be obtained in the target position; and a process of guiding sound fields of different transducer array elements to superpose in the target position is a transmission and focusing process. Specifically, a transmitting pulse generated by a transmitter circuit excites various transducer array elements according to a specific delay time, so that a transducer array element farther away from a focusing position performs transmission earlier, and the correspondingly set delay time is shorter; and transducers that are closer to the focusing position are transmitted later, and the correspondingly set delay time is longer. In this way, ultrasound waves transmitted by all transducer array elements may reach a target position at the same time, and form a focus in the target position. For focused ultrasound waves, focusing positions corresponding to different transmission angles are different.

Unfocused ultrasound waves mainly include plane waves and scattered waves. For plane waves, the transducer array elements in the ultrasound probe may be controlled to excite synchronously to generate ultrasound waves parallel to a plane of the transducer array elements; alternatively, the transducer array elements are excited in sequence based on a delay time calculated based on a deflection angle, to transmit ultrasound waves at a specific deflection angle. Divergent waves mean that there are one or more virtual focus points behind the ultrasound probe, and transmitting waveforms take the virtual focus points as centers. Before a transmission delay is set to obtain an arc-shaped transmitting wave, as a depth increases, the divergent waves gradually diverge for a larger field of view with a smaller aperture.

In step S520, the echo of the ultrasound wave is received at each transmission angle to obtain the ultrasound echo signal corresponding to each transmission angle. Exemplarily, each time a transmission is completed, a receiver circuit controls the transducer array elements in the ultrasound probe to receive echoes of the ultrasound waves transmitted in the previous step from each receiving point in a target region, and convert the echoes into electrical signals to obtain ultrasound echo signals. Because different receiving points in the tissue have different distances from the same transducer array element, and distances from the same receiving point to different transducer array elements are also different, a transducer array element may receive ultrasound echo signals with signal strength variations over a period of time, and convert the ultrasound echo signals into electrical signals which then become an analog signal with continuously changing amplitude. The analog signal is referred to as a channel signal corresponding to this transmission.

Exemplarily, after converting the received ultrasound waves into electrical signals, the transducer array element may further perform gain amplification, filtering, analog-to-digital conversion, and the like on the electrical signals, which are then sent to a beamforming module for beamforming. When an ultrasound wave is propagated in the tissue, its intensity decreases with an increase of a propagation distance. Therefore, it is required to perform gain amplification on an ultrasound echo signal, that is, a gain change of an amplifier is controlled, such that magnification of an ultrasound echo signal with a longer propagation distance is relatively large, and magnification of an ultrasound echo signal with a shorter propagation distance is relatively small, to compensate for attenuation of ultrasound waves at different depths. At the same time, a noise signal in the ultrasound echo signal is also amplified, and because the noise does not have attenuation characteristics of the ultrasound signal, and after the gain amplification, the noise increases with an increase of different distances, it is further required to filter the ultrasound echo signal after the gain amplification. The analog-to-digital conversion refers to conversion of an analog signal into a digital signal for subsequent digital signal processing.

In step S530, for the ultrasound echo signal corresponding to each transmission angle, beamforming is performed at the at least two different receiving angles to obtain the beamformed data corresponding to the different receiving angles. The beamforming refers to performing corresponding processing such as delaying and weighted summation on different channel signals in the ultrasound echo signal corresponding to each transmission angle, which is a transformation process from channel domain data to imaging receiving grid points. Due to different distances from the same receiving point in the tissue to different transducer array elements, channel data at the same receiving point that is output by different transducer array elements have delay differences, and a function of delaying processing is to perform phase alignment on different channel signals. Then, weighted summation is performed on different channel data at the same receiving point, to obtain a beamformed ultrasound echo signal.

When beamforming is performed, an angle formed by a line between a receiving grid point and a center point of a receiving aperture used for receiving beamforming and a normal line is referred to as a receiving angle. Performing beamforming at different receiving angles means that in each beamforming process, delays are respectively calculated based on different receiving angles, to obtain beamformed data corresponding to the different receiving angles. Performing beamforming at different receiving angles can achieve, through an algorithm, an effect similar to a plurality of deflected transmissions.

In some embodiments, the receiving angles include a vertical receiving angle parallel to the vertical transmission angle and at least two deflected receiving angles respectively parallel to the at least two deflected transmission angles. When receiving angles or transmission angles are symmetrical based on the vertical transmission angle, obtained ultrasound echo signals have higher coherence, and the effect of coherent compounding is better. Moreover, when the number of transmission angles and the number of receiving angles are the same, it is easier to perform subsequent data processing.

In a conventional ultrasound imaging process, one transmission angle corresponds to only one receiving angle, but in the embodiment of the disclosure, one transmission angle not only corresponds to one receiving angle, but may correspond to two or more receiving angles. For example, still referring to FIG. 6, when the first transmission angle, the second transmission angle, and the third transmission angle are used for transmission, receiving angles all include the first receiving angle, the second receiving angle, and the third receiving angle. That is, although transmission is performed three times at different transmission angles, beamforming processing is performed nine times in total, and nine sets of different beamformed data are obtained.

In the example of FIG. 6, the second transmission angle is the vertical transmission angle, and the first transmission angle and the third transmission angle are the deflected transmission angles that are symmetrical to each other with respect to the first transmission angle. The second receiving angle is the vertical receiving angle, and the first receiving angle and the third receiving angle are respectively parallel to the first transmission angle and the third transmission angle. Therefore, it may be ensured that each transmission angle has a receiving angle parallel to the transmission angle and at least one deflected receiving angle to ensure the imaging effect.

Figure 10:
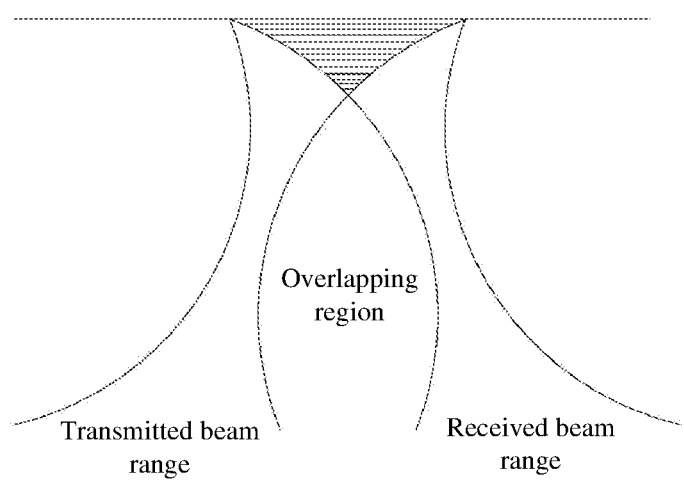
FIG. 10 is a schematic diagram of an overlapping region between a transmission angle and a receiving angle according to an embodiment of the disclosure.

The number of transmission angles and the number of receiving angles in the embodiment of the disclosure may be set according to actual needs. For example, when a relatively low frame rate of an ultrasound image is required, more transmission angles or receiving angles may be used to improve the quality of the ultrasound image; and when a relatively high frame rate of an ultrasound image is required, a number of transmission angles or receiving angles may be appropriately reduced to increase the frame rate. In general, the transmission angle and the receiving angle are the same. If a difference between the transmission angle and the receiving angle is relatively large, and an overlapping region between a transmitted beam and a received beam is relatively small, acoustic energy is not concentrated, as shown in FIG. 10. In this case, selective receiving may be made, so that an included angle between a line along which each transmission angle is located and a line along which a corresponding receiving angle is located does not exceed a maximum included angle between a normal direction of an array element that transmits the ultrasound wave and the transmission angle. For example, in the example of FIG. 6, beamforming processing may be performed only at the first receiving angle and the second receiving angle for the first transmission angle, and beamforming processing may be performed at only the second receiving angle and the third receiving angle for the third transmission angle, to improve the signal-to-noise ratio.

Figure 9:
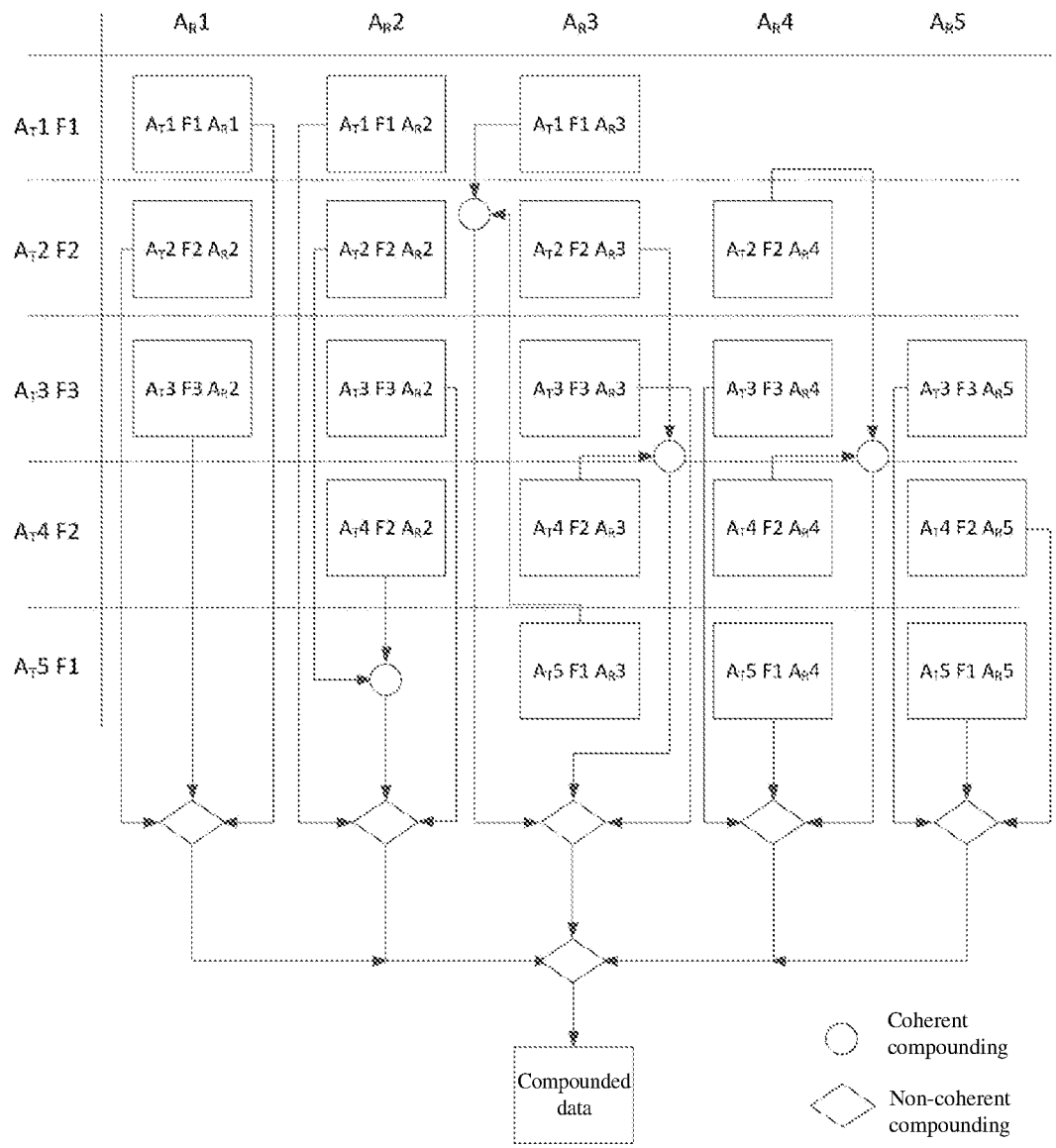
FIG. 9 is a schematic diagram of coherent compounding and non-coherent compounding according to another embodiment of the disclosure.

For another example, in an example of FIG. 9, five transmission angles and three transmitting frequencies are used, a difference between the first transmission angle, a fourth receiving angle, and a fifth receiving angle is relatively large, and an overlapping region between a transmitted beam and a received beam is very small, and a compounding effect on the whole is also relatively small. At this time, only the first receiving angle, the second receiving angle, and the third receiving angle, rather than the fourth receiving angle and the fifth receiving angle, may be selected for the first transmission angle. Similarly, only the third receiving angle, the fourth receiving angle, and the fifth receiving angle, rather than the first receiving angle and the second receiving angle, are used for the fifth transmission angle. In this way, some acceptance angles with poor effects are discarded, and the number of obtained views is reduced, but an amount of data is reduced, a calculation amount of the system is reduced, and the complexity of the ultrasound imaging system is reduced.

After step S530 is performed, a plurality of sets of beamformed data are obtained, each set of beamformed data corresponds to one transmission angle, one transmitting frequency, and one receiving angle, and each set of beamformed data can form one view. Because a signal with both amplitude and phase modulated is obtained after the beamforming is completed, envelope detection and logarithmic compression also need to be performed to further obtain amplitude information of an echo for imaging. An object of the envelope detection is to extract amplitude information from a radio frequency signal. Exemplarily, a Hilbert transform method may be used for envelope detection. An original signal is subjected to the Hilbert transform to obtain an orthogonal signal of the original signal. With the original signal as a real part, and the orthogonal signal obtained by the Hilbert transform as an imaginary part, a complex analytic signal is constructed. A modulus of the signal is an envelope of the original signal. An ultrasound echo signal after the envelope detection is an amplitude envelope curve of the ultrasound echo signal. Values on the envelope curve cannot be directly used for imaging, and an original value range of the envelope curve needs to be mapped to an imaging interval of the ultrasound imaging system, that is, logarithmic compression. After the envelope detection and logarithmic compression, a real signal is transformed into a complex signal.

In step S540, the coherent compounding and the non-coherent compounding are performed on the above at least two sets of beamformed data. If the beamformed data is compounded before the envelope detection, the beamformed data carries phase information, and the phase information of the data is used during the compounding. Such compounding is referred to as coherent compounding. If the beamformed data is compounded after the envelope detection, data used for compounding does not carry phase information, but amplitude information of the data is used during compounding. Such compounding is referred to as non-coherent compounding. According to this embodiment of the disclosure, both the coherent compounding and the non-coherent compounding are performed, and at the same time, amplitude information and phase information of data corresponding to different angles are used to improve the image quality. The compounded data obtained after performing the coherent compounding and the non-coherent compounding includes information about at least two types of frequencies, thus balancing a penetration capability and a spatial resolution of an ultrasound image.

The coherent compounding needs to be performed between beamformed data of the same frequency, and the beamformed data on which the coherent compounding is performed has the same transmission angle or the same receiving angle, so as to perform phase alignment and reduce the difficulty of a compounding algorithm. In the ultrasound imaging method 500 of this embodiment of the disclosure, the coherent compounding is performed on the beamformed data corresponding to the same receiving angle, the same transmitting frequency, and the different transmission angles, and sound field information of different transmission angles is coherently compounded at the same receiving angle, which improves the image signal-to-noise ratio and spatial resolution. The coherent compounding can also weaken the impact of a plurality of reflections at the boundary, which is beneficial to noise reduction in a lumen of a blood vessel. The non-coherent compounding is performed on the coherently compounded data corresponding to the different receiving angles, speckle noise is suppressed, noise of an ultrasound image is reduced, the image quality is further improved, and information about different frequencies is compounded. Moreover, the coherent compounding of data at the same receiving angle may be performed based on the receiving aperture, which reduces the complexity of data processing.

Figure 7:
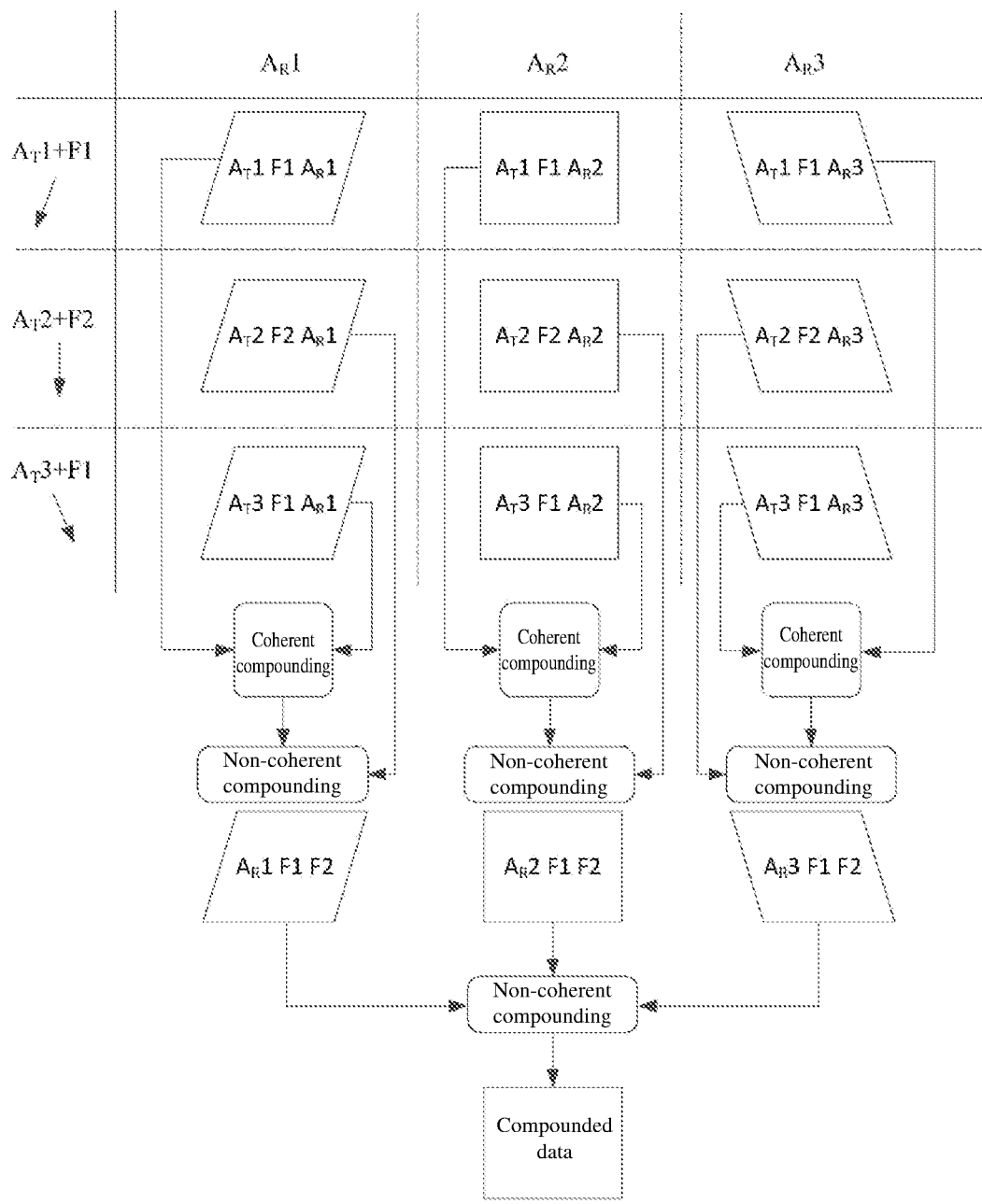
FIG. 7 is a schematic diagram of coherent compounding and non-coherent compounding according to an embodiment of the disclosure.

Because in at least three different transmission angles, the ultrasound waves at least two transmission angles have different transmitting frequencies, and the ultrasound waves at at least two transmission angles have the same transmitting frequency, in different transmission angles corresponding to the same receiving angle, there are at least two transmission angles being corresponding to the same transmitting frequency. For example, in the example of FIG. 6, in the first transmission angle, the second transmission angle, and the third transmission angle corresponding to the first receiving angle, the first transmission angle and the third transmission angle both correspond to the first transmitting frequency. Therefore, as shown in FIG. 7, coherent compounding may be performed on beamformed data corresponding to a first receiving angle $A_R1$, a first transmission angle $A_T1$, and a first transmitting frequency F1 and beamformed data corresponding to the first receiving angle $A_R1$, a third transmission angle $A_T3$, and the first transmitting frequency F1 to obtain first coherently compounded data; coherent compounding may be performed on beamformed data corresponding to a second receiving angle $A_R2$, the first transmission angle $A_T1$, and the first transmitting frequency F1 and beamformed data corresponding to the second receiving angle $A_R2$, the third transmission angle $A_T3$, and the first transmitting frequency F1 to obtain second coherently compounded data; and coherent compounding may be performed on beamformed data corresponding to a third receiving angle $A_R3$, the first transmission angle $A_T1$, and the first transmitting frequency F1 and beamformed data corresponding to the third receiving angle $A_R3$, the third transmission angle $A_T3$, and the first transmitting frequency F1 to obtain third coherently compounded data. Then, non-coherent compounding is performed with beamformed data not subjected to the coherent compounding, that is, beamformed data corresponding to the first receiving angle $A_R1$, the second transmission angle $A_T2$, and a second transmitting frequency F2, beamformed data corresponding to the second receiving angle $A_R2$, the second transmission angle $A_T2$, and the second transmitting frequency F2, and the beamformed data corresponding to the third receiving angle $A_R3$, the second transmission angle $A_T2$, and the second transmitting frequency F2, to obtain final compounded data, and an ultrasound image is generated based on the compounded data.

In FIG. 7, when non-coherent compounding is performed, non-coherent compounding is first performed on coherently compounded data corresponding to each receiving angle and beamformed data not subjected to the coherent compounding corresponding to the receiving angle, to obtain non-coherently compounded data that combines information about different frequencies and corresponds to each receiving angle, and then non-coherent compounding is performed on non-coherently compounded data corresponding to different receiving angles, to obtain compounded data that combines different spatial information and different frequency information. For example, non-coherent compounding is performed on the first coherently compounded data and the beamformed data corresponding to the first receiving angle $A_R1$, the second transmission angle $A_T2$, and the second transmitting frequency F2, to obtain first non-coherently compounded data corresponding to the first receiving angle, where the first non-coherently compounded data includes information about the first transmitting frequency F1 and the second transmitting frequency F2; and then non-coherent compounding is performed on the first non-coherently compounded data, second non-coherently compounded data corresponding to the second receiving angle, and third non-coherently compounded data corresponding to the third receiving angle. In the above compounding strategy, coherent compounding and non-coherent compounding are performed on data corresponding to different transmission angles and transmitting frequencies for each receiving angle, and view data including information about all transmitting frequencies is obtained at each receiving angle, without requiring a plurality of transmitting frequencies to be used for transmission at each transmission angle, which further improves the image quality without reducing the frame rate.

Figure 8:
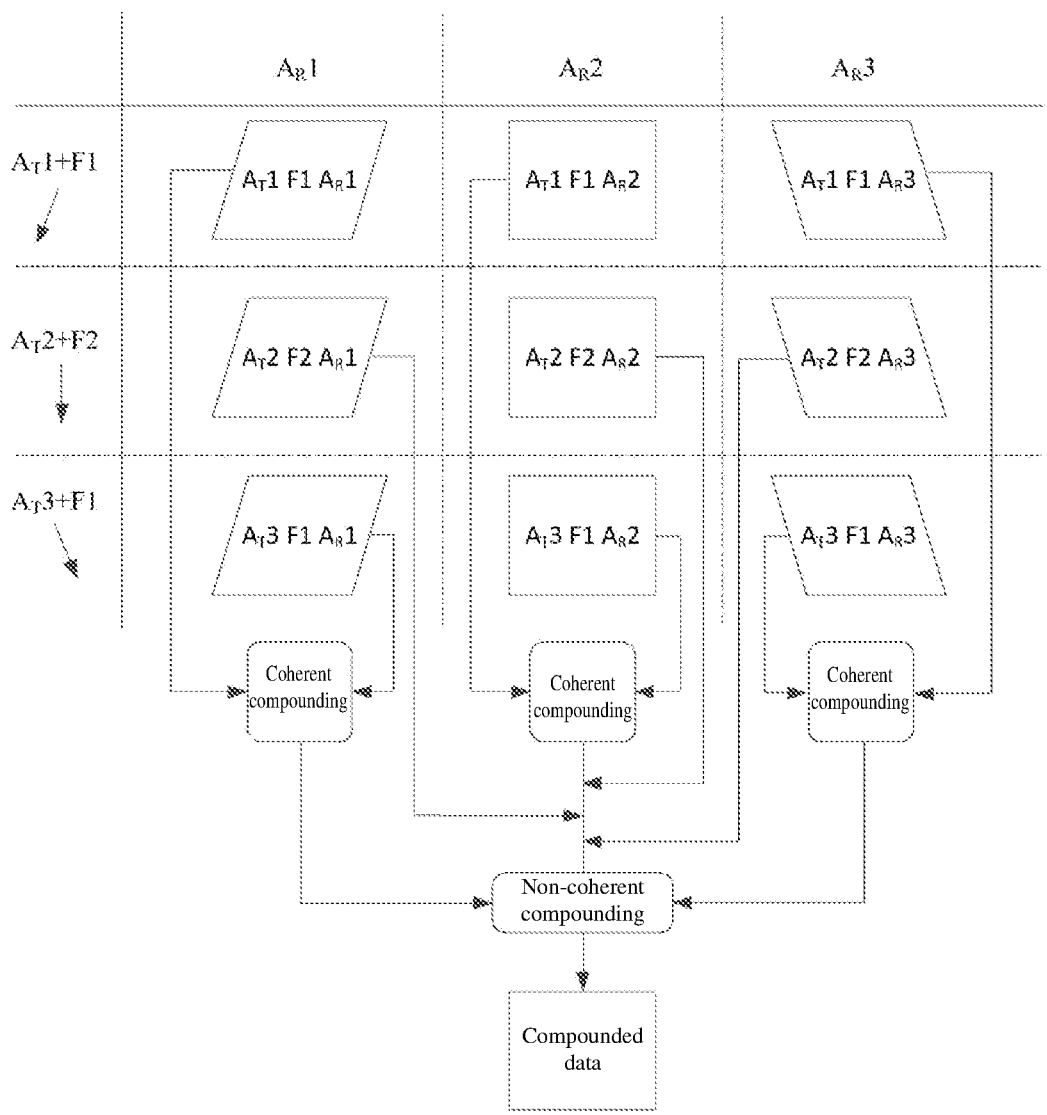
FIG. 8 is a schematic diagram of coherent compounding and non-coherent compounding according to another embodiment of the disclosure.

Alternatively, non-coherent compounding may be performed in one step, that is, coherently compounded data corresponding to each receiving angle is first obtained, and then non-coherent compounding is performed on coherently compounded data corresponding to a plurality of receiving angles and beamformed data not subjected to the coherent compounding and corresponding to the plurality of receiving angles. As shown in FIG. 8, non-coherent compounding is simultaneously performed on the first coherently compounded data, the second coherently compounded data, the third coherently compounded data, the beamformed data corresponding to the second transmission angle $A_T2$, the second transmitting frequency F2, and the first receiving angle $A_R1$, the beamformed data corresponding to the second transmission angle $A_T2$, the second transmitting frequency F2, and the second receiving angle $A_R2$, and beamformed data corresponding to the second transmission angle $A_T2$, the second transmitting frequency F2, and the third receiving angle $A_R3$, such that compounded data including information about each angle and frequency can also be obtained.

FIG. 7 and FIG. 8 show embodiments of three transmission angles, three receiving angles, and two transmitting frequencies, and more transmission angles, transmitting frequencies, and receiving angles may be used in practical applications. At some receiving angles, coherent compounding may not be performed, and only non-coherent compounding is performed, that is, coherent compounding may be performed at some or all of the receiving angles. At some receiving angles, coherent compounding may be alternatively performed more than one time.

For example, referring to FIG. 9, transmission angles include the first transmission angle $A_T1$, the second transmission angle $A_T2$, the third transmission angle $A_T3$, a fourth transmission angle $A_T4$, and a fifth transmission angle $A_T5$. The third transmission angle $A_T3$ is the vertical transmission angle, the first transmission angle $A_T1$ and the fifth transmission angle $A_T5$ are the deflected transmission angles that are symmetrical to each other with respect to the third transmission angle $A_T3$, and the second transmission angle $A_T2$ and the fourth transmission angle $A_T4$ are the deflected transmission angles that are symmetrical to each other with respect to the third transmission angle $A_T3$. A transmitting frequency corresponding to the first transmission angle $A_T1$ and the fifth transmission angle $A_T5$ is the first transmitting frequency F1, a transmitting frequency corresponding to the second transmission angle $A_T2$ and the fourth transmission angle $A_T4$ is the second transmitting frequency F2, and a transmitting frequency corresponding to the third transmission angle $A_T3$ is a third transmitting frequency F3.

To prevent a deviation between a transmission angle and a receiving angle from being too large, receiving angles corresponding to the first transmission angle $A_T1$ are the first receiving angle $A_R1$, the second receiving angle $A_R2$, and the third receiving angle $A_R3$; receiving angles corresponding to the second transmission angle $A_T2$ are the first receiving angle $A_R1$, the second receiving angle $A_R2$, the third receiving angle $A_R3$, and the fourth receiving angle $A_R4$; receiving angles corresponding to the third transmission angle $A_T3$ are the first receiving angle $A_R1$, the second receiving angle $A_R2$, the third receiving angle $A_R3$, the fourth receiving angle $A_R4$, and the fifth receiving angle $A_R5$; receiving angles corresponding to the fourth transmission angle $A_T4$ are the second receiving angle $A_R2$, the third receiving angle $A_R3$, the fourth receiving angle $A_R4$, and the fifth receiving angle $A_R5$; and receiving angles corresponding to the fifth transmission angle $A_T5$ are the second receiving angle $A_R2$, the third receiving angle $A_R3$, the fourth receiving angle $A_R4$, and the fifth receiving angle $A_R5$. The third receiving angle $A_R3$ is the vertical receiving angle, the first receiving angle $A_R1$ and the fifth receiving angle $A_R5$ are respectively parallel to the first transmission angle $A_T1$ and the fifth transmission angle $A_T5$, and the second receiving angle $A_R2$ and the fourth receiving angle $A_R4$ are respectively parallel to the second transmission angle $A_T2$ and the fourth transmission angle $A_T4$.

Based on the above transmitting and receiving strategy, when the obtained beamformed data is compounded, at the first receiving angle $A_R1$ and the fifth receiving angle $A_R5$, only non-coherent compounding is performed because there is no beamformed data corresponding to the same transmitting frequency. Coherent compounding at the second receiving angle $A_R2$ includes performing coherent compounding on the beamformed data corresponding to the second transmission angle $A_T2$, the second transmitting frequency F2, and the second receiving angle $A_R2$, and beamformed data corresponding to the fourth transmission angle $A_T4$, the second transmitting frequency F2, and the second receiving angle $A_R2$, to obtain fourth coherently compounded data. Coherent compounding at the third receiving angle $A_R3$ includes: performing coherent compounding on the beamformed data corresponding to the first transmission angle $A_T1$, the first transmitting frequency F1, and the third receiving angle $A_R3$, and beamformed data corresponding to the fifth transmission angle $A_T5$, the first transmitting frequency F1, and the third receiving angle $A_R3$, to obtain fifth coherently compounded data; and performing coherent compounding on the beamformed data corresponding to the second transmission angle $A_T2$, the second transmitting frequency F2, and the third receiving angle $A_R3$, and beamformed data corresponding to the fourth transmission angle $A_T4$, the second transmitting frequency F2, and the third receiving angle $A_R3$, to obtain sixth coherently compounded data. Coherent compounding at the fourth receiving angle $A_R4$ includes performing coherent compounding on beamformed data corresponding to the second transmission angle $A_T2$, the second transmitting frequency F2, and the fourth receiving angle $A_R4$, and beamformed data corresponding to the fourth transmission angle $A_T4$, the second transmitting frequency F2, and the fourth receiving angle $A_R4$, to obtain seventh coherently compounded data. Finally, non-coherent compounding is performed on the fourth coherently compounded data, the fifth coherently compounded data, the sixth coherently compounded data, the seventh coherently compounded data, and the beamformed data not subjected to the coherent compounding, to obtain final compounded data. The compounded data is used to form a frame of ultrasound image.

When coherent compounding or non-coherent compounding is performed, it is required to assign different weights to different beamformed data, and for the different weights, different imaging effects may be achieved. In an embodiment, coherent compounding or non-coherent compounding may be performed based on a preset weight coefficient. The preset weight coefficient may be calculated based on a geometric positional relationship between a transmitted signal and a received signal of the ultrasound probe. Alternatively, when spatial compounding is performed, the weight coefficient may be calculated according to a set algorithm rule or adaptively calculated for coherent compounding or non-coherent compounding. An adaptive weight coefficient is a weight coefficient calculated based on characteristics of an ultrasound echo signal, and performing dynamic weighting based on the adaptive weight coefficient can effectively improve the image quality. Exemplarily, for coherent compounding, it may be required to calculate coherence between different beamformed data. A calculation method includes a coherence factor, an eigenvalue analysis, and the like, which can identify data with strong coherence and data with weak coherence, and a larger weight may be assigned to data with strong coherence. For non-coherent compounding, compounding methods used include average value compounding, taking a minimum value, taking a maximum value, adaptive calculation, and so on.

Then, in step S550, the ultrasound image is generated based on the compounded data. Specifically, image processing is performed on the compounded data to obtain displayable ultrasound image data, which is output to a display for display. Through coherent compounding and non-coherent compounding, both the hyperechoic and hypoechoic regions in the tissue can be well displayed, and a gray scale of the ultrasound image can be displayed clearly.

In conclusion, in the ultrasound imaging method 500 of this embodiment of the disclosure, the coherent compounding is performed on the beamformed data corresponding to the same receiving angle, the same transmitting frequency, and the different transmission angles, non-coherent compounding is performed on the coherently compounded data and the beamformed data not subjected to the coherent compounding, the compounded image can include information about a plurality of frequencies without requiring exactly all transmitting frequencies to be used for transmission at each transmission angle, and a spatial resolution, a penetration capability, and a temporal resolution of the compounded image can be ensured without reducing a frame rate; in a compounding process, both coherent compounding and non-coherent compounding are performed, and phase information and amplitude information of data are combined; and coherent compounding is performed between data corresponding to the same receiving angle and the same transmitting frequency, which reduces the difficulty of a compounding algorithm.

Figure 11:
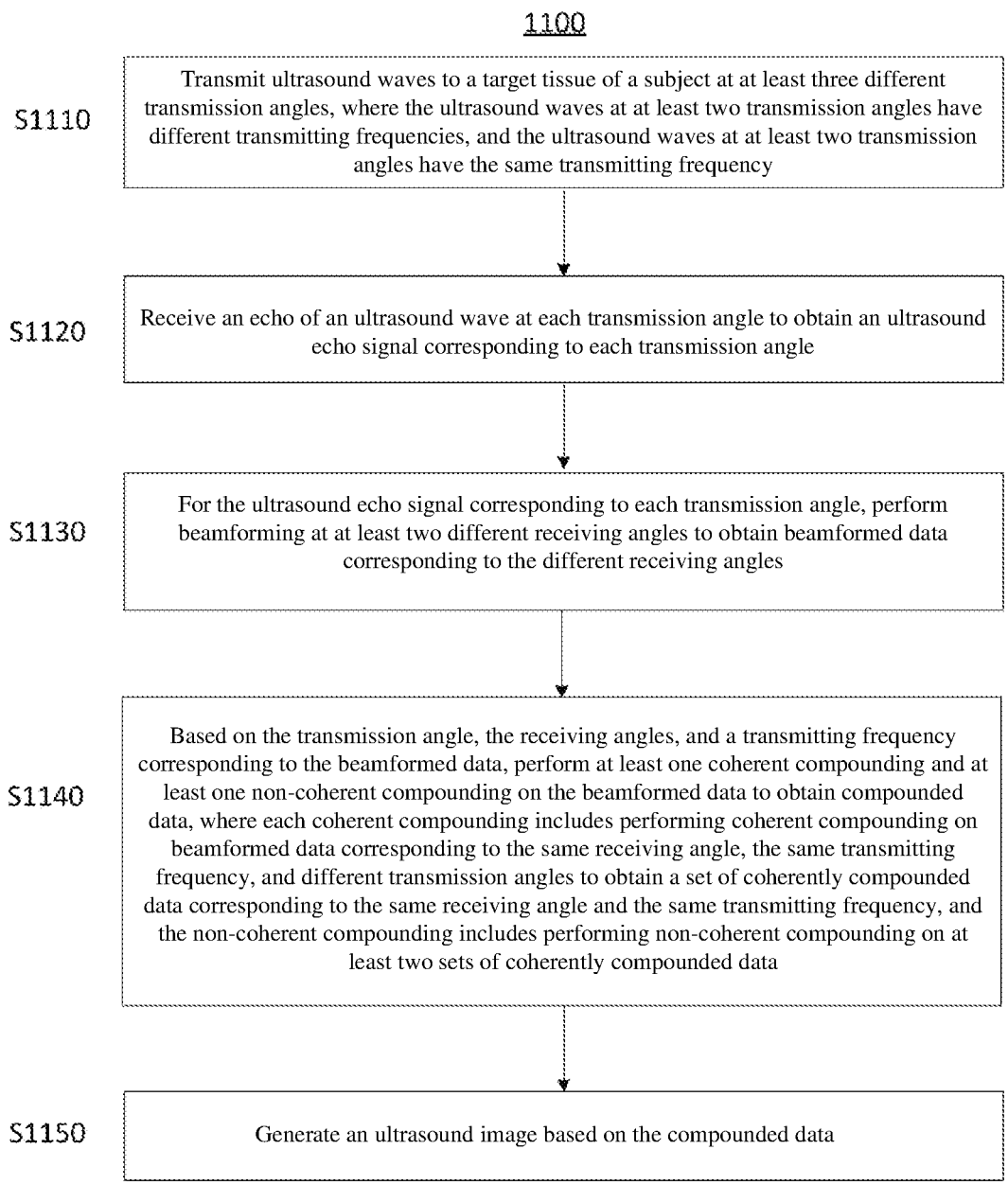
FIG. 11 is a schematic diagram of an ultrasound imaging method according to another embodiment of the disclosure.

Another aspect of an embodiment of the disclosure provides an ultrasound imaging method. Referring to FIG. 11, the ultrasound imaging method 1100 includes the following steps.

In step S1110, ultrasound waves are transmitted to a target tissue of a subject at least three different transmission angles, where the ultrasound waves at least two transmission angles have different transmitting frequencies, and the ultrasound waves at least two transmission angles have the same transmitting frequency.

In step S1120, an echo of an ultrasound wave is received at each transmission angle to obtain an ultrasound echo signal corresponding to each transmission angle.

In step S1130, for the ultrasound echo signal corresponding to each transmission angle, beamforming is performed at least two different receiving angles to obtain beamformed data corresponding to the different receiving angles.

In step S1140, based on the transmission angle, the receiving angles, and a transmitting frequency corresponding to the beamformed data, at least one coherent compounding and at least one non-coherent compounding are performed on the beamformed data to obtain compounded data, where each coherent compounding includes performing coherent compounding on beamformed data corresponding to the same receiving angle, the same transmitting frequency, and different transmission angles to obtain a set of coherently compounded data corresponding to the same receiving angle and the same transmitting frequency, and the non-coherent compounding includes performing non-coherent compounding on at least two sets of coherently compounded data.

In step S1150, an ultrasound image is generated based on the compounded data.

Similar to the ultrasound imaging method 500 in the embodiment of the disclosure, the ultrasound imaging method 1100 also includes transmitting the ultrasound waves at the at least three transmission angles, and performing beamforming at the at least two receiving angles for the ultrasound echo signal corresponding to each transmission angle. The ultrasound waves at least two transmission angles have different transmitting frequencies, and the ultrasound waves at least two transmission angles have the same transmitting frequency. When compounding is performed, coherent compounding is performed on beamformed data corresponding to the same receiving angle, different transmission angles, and the same transmitting frequency. A difference from the ultrasound imaging method 500 is that in the ultrasound imaging method 1100 of this embodiment of the disclosure, coherent compounding may be first performed on all beamformed data corresponding to the same receiving angle, and then non-coherent compounding is performed on coherently compounded data, rather than directly performing non-coherent compounding on beamformed data not subjected to the coherent compounding. For example, the same receiving angle corresponds to four different transmission angles, a first transmission angle and a fourth transmission angle have the same transmitting frequency, and a second transmission angle and a third transmission angle have the same transmitting frequency. In this case, coherent compounding may be performed on every two pieces of beamformed data corresponding to the four transmission angles, and then non-coherent compounding is performed on obtained two sets of coherently compounded data. The compounding strategy in the ultrasound imaging method 1100 may also be used in combination with the compounding strategy in the ultrasound imaging method 500, that is, the compounding strategy in the ultrasound imaging method 500 is used for some receiving angles, and the compounding strategy in the ultrasound imaging method 1100 is used for some receiving angles.

Figure 12:
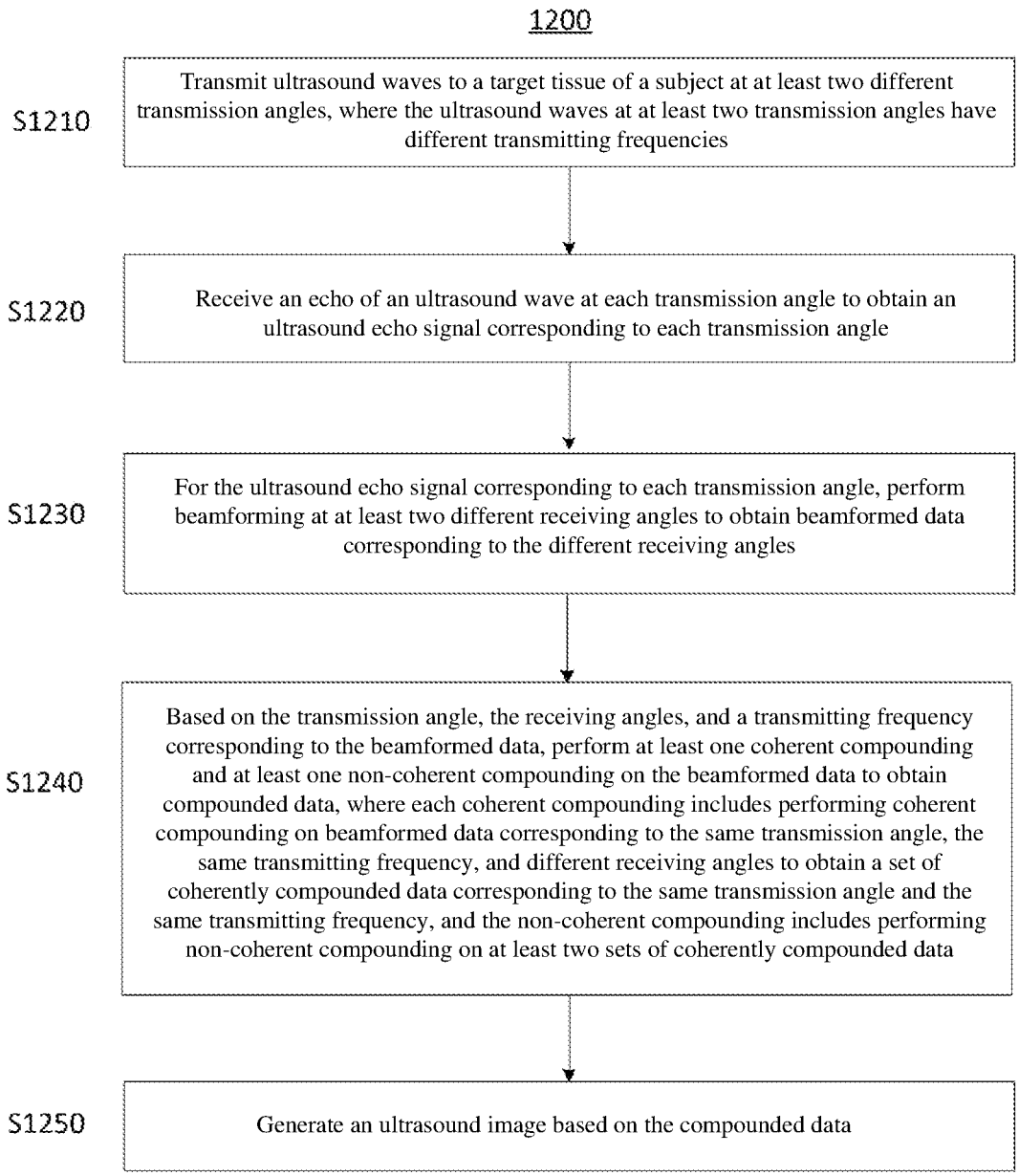
FIG. 12 is a schematic diagram of an ultrasound imaging method according to another embodiment of the disclosure.

Another aspect of an embodiment of the disclosure provides an ultrasound imaging method. Referring to FIG. 12, the ultrasound imaging method 1200 includes the following steps.

In step S1210, ultrasound waves are transmitted to a target tissue of a subject at least two different transmission angles, where the ultrasound waves at least two transmission angles have different transmitting frequencies.

In step S1220, an echo of an ultrasound wave is received at each transmission angle to obtain an ultrasound echo signal corresponding to each transmission angle.

In step S1230, for the ultrasound echo signal corresponding to each transmission angle, beamforming is performed at least two different receiving angles to obtain beamformed data corresponding to the different receiving angles.

In step S1240, based on the transmission angle, the receiving angles, and a transmitting frequency corresponding to the beamformed data, at least one coherent compounding and at least one non-coherent compounding are performed on the beamformed data to obtain compounded data, where each coherent compounding includes performing coherent compounding on beamformed data corresponding to the same transmission angle, the same transmitting frequency, and different receiving angles to obtain a set of coherently compounded data corresponding to the same transmission angle and the same transmitting frequency, and the non-coherent compounding includes performing non-coherent compounding on at least two sets of coherently compounded data.

In step S1250, an ultrasound image is generated based on the compounded data.

In the ultrasound imaging method 1200 in this embodiment of the disclosure, the ultrasound waves are transmitted at the at least two transmission angles, and beamforming is performed at the at least two receiving angles for the ultrasound echo signal corresponding to each transmission angle. The ultrasound waves at least two transmission angles have different transmitting frequencies. When compounding is performed, coherent compounding is performed on beamformed data corresponding to the same transmission angle and different receiving angles. Because beamformed data corresponding to any receiving angle for the same transmission angle corresponds to the same transmitting frequency, it is easier to perform data processing by performing coherent compounding on the beamformed data corresponding to the same transmission angle and different receiving angles.

In some embodiments, when coherent compounding is performed on beamformed data corresponding to the same transmission angle, the same transmitting frequency, and different receiving angles, coherent compounding may be performed on the beamformed data corresponding to all the receiving angles for each transmission angle to obtain coherently compounded data corresponding to each transmission angle. When non-coherent compounding is performed later, non-coherent compounding may be performed on the coherently compounded data corresponding to all transmission angles to obtain the compounded data. For example, in the example of FIG. 6, coherent compounding may be performed on beamformed data corresponding to the first transmission angle and three different receiving angles at a first transmitting frequency to obtain coherently compounded data corresponding to the first transmission angle; coherent compounding may be performed on beamformed data corresponding to the second transmission angle and three different receiving angles at a second transmitting frequency to obtain coherently compounded data corresponding to the second transmission angle; coherent compounding may be performed on beamformed data corresponding to the third transmission angle and three different receiving angles at the first transmitting frequency to obtain coherently compounded data corresponding to the third transmission angle; and finally, non-coherent compounding is performed on three sets of coherently compounded data, to obtain compounded data, so that the compounded data includes frequency information of the first transmitting frequency and the second transmitting frequency and spatial information of a plurality of different angles.

In some embodiments, the transmission angles include a vertical transmission angle perpendicular to a plane where an array element that transmits the ultrasound wave is located and at least two deflected transmission angles that are symmetrical to each other with respect to the vertical transmission angle; and the receiving angles include a vertical receiving angle parallel to the vertical transmission angle and at least two deflected receiving angles respectively parallel to the at least two deflected transmission angles. Exemplarily, an included angle between a line along which each transmission angle is located and a line along which a corresponding receiving angle is located does not exceed a maximum included angle between a normal direction of an array element that transmits the ultrasound wave and the transmission angle, to ensure signal strength. A number of different receiving angles among all the receiving angles is the same as that of different transmission angles among all the transmission angles, to reduce the difficulty of data processing.

Because coherent compounding is performed on data at the same transmission angle in the ultrasound imaging method 1200, it may be ensured that data on which coherent compounding is performed has the same transmitting frequency, and therefore, different transmitting frequencies may be used for different transmission angles. In other embodiments, at least two transmission angles in different transmission angles may be alternatively made to correspond to the same transmitting frequency, to reduce the difficulty of data processing, for example, two deflected transmission angles that are symmetrical to each other with respect to the vertical transmission angle correspond to the same transmitting frequency, to further improve the coherence of the data.

In the ultrasound imaging method 1200 of this embodiment of the disclosure, the coherent compounding is performed on the beamformed data corresponding to the same transmission angle, the same transmitting frequency, and the different receiving angles, non-coherent compounding is performed on the at least two sets of coherently compounded data, the compounded image can include information about a plurality of frequencies without requiring exactly all transmitting frequencies to be used for transmission at each transmission angle, and a spatial resolution, a penetration capability, and a temporal resolution of the compounded image can be ensured without reducing a frame rate; in a compounding process, both coherent compounding and non-coherent compounding are performed, and phase information and amplitude information of data are combined; and coherent compounding is performed between data corresponding to the same transmission angle and the same transmitting frequency, which reduces the difficulty of a compounding algorithm. For more specific details of the ultrasound imaging method 1200, reference may be made to the related description of the ultrasound imaging method 500. Details are not described herein again.

Figure 13:
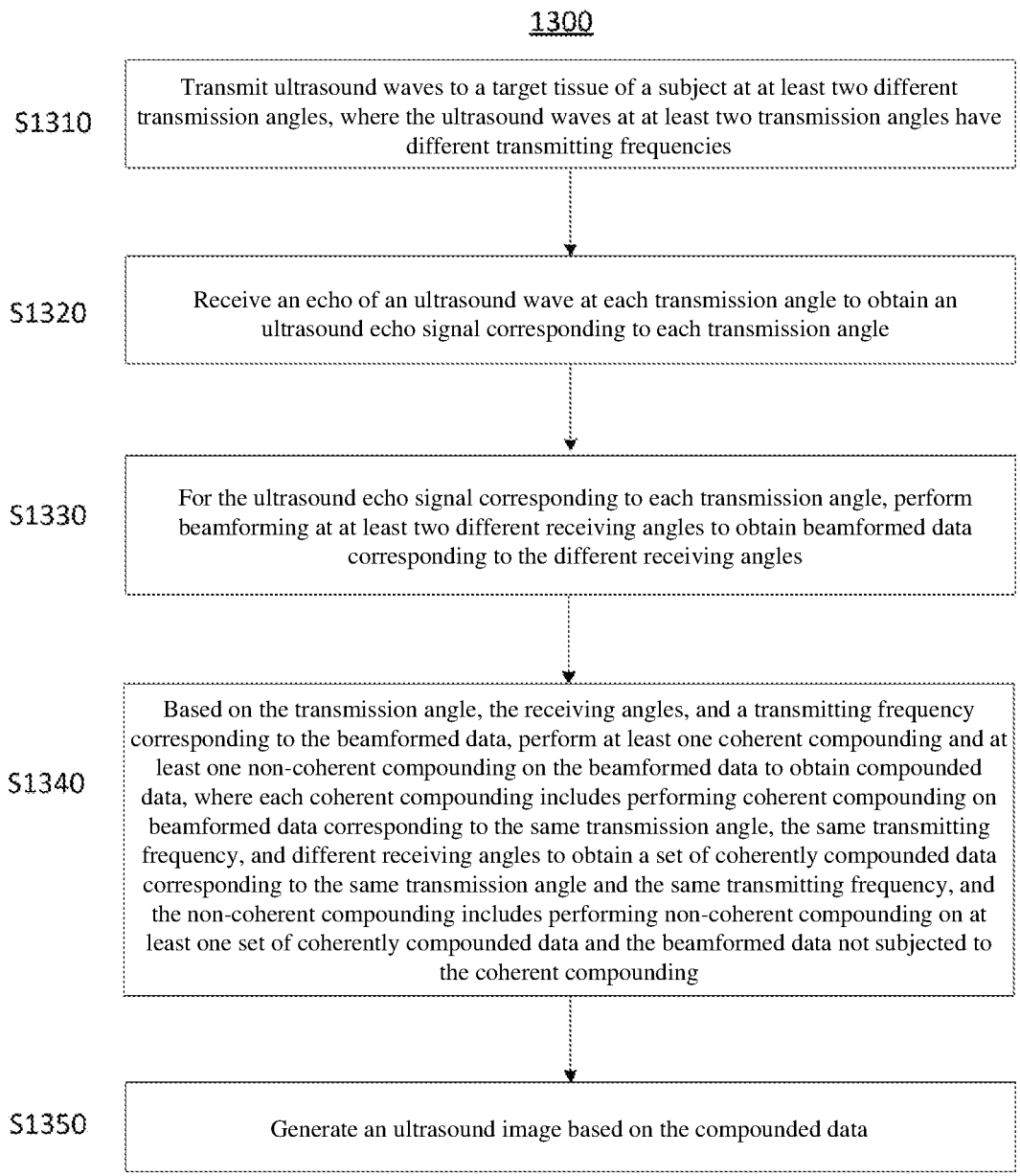
FIG. 13 is a schematic diagram of an ultrasound imaging method according to another embodiment of the disclosure.

Another aspect of an embodiment of the disclosure provides an ultrasound imaging method. Referring to FIG. 13, the ultrasound imaging method 1300 includes the following steps.

In step S1310, ultrasound waves are transmitted to a target tissue of a subject at least two different transmission angles, where the ultrasound waves at least two transmission angles have different transmitting frequencies.

In step S1320, an echo of an ultrasound wave is received at each transmission angle to obtain an ultrasound echo signal corresponding to each transmission angle.

In step S1330, for the ultrasound echo signal corresponding to each transmission angle, beamforming is performed at least two different receiving angles to obtain beamformed data corresponding to the different receiving angles.

In step S1340, based on the transmission angle, the receiving angles, and a transmitting frequency corresponding to the beamformed data, at least one coherent compounding and at least one non-coherent compounding are performed on the beamformed data to obtain compounded data, where each coherent compounding includes performing coherent compounding on beamformed data corresponding to the same transmission angle, the same transmitting frequency, and different receiving angles to obtain a set of coherently compounded data corresponding to the same transmission angle and the same transmitting frequency, and the non-coherent compounding includes performing non-coherent compounding on at least one set of coherently compounded data and the beamformed data not subjected to the coherent compounding.

In step S1350, an ultrasound image is generated based on the compounded data.

Similar to the ultrasound imaging method 1200 in the embodiment of the disclosure, the ultrasound imaging method 1300 also includes transmitting the ultrasound waves at the at least two transmission angles, where the ultrasound waves at the at least two transmission angles have different transmitting frequencies, and performing beamforming at the at least two receiving angles for the ultrasound echo signal corresponding to each transmission angle. When compounding is performed, coherent compounding is performed on beamformed data corresponding to the same transmission angle and different receiving angles. A difference from the ultrasound imaging method 1200 is that in the ultrasound imaging method 1300 of this embodiment of the disclosure, after the coherently compounded data is obtained, the non-coherent compounding is performed on the coherently compounded data and the beamformed data not subjected to the coherent compounding, to obtain the compounded data, and the ultrasound image is generated based on the compounded data.

In some embodiments, the transmission angles include a vertical transmission angle perpendicular to a plane where an array element that transmits the ultrasound wave is located and at least two deflected transmission angles that are symmetrical to each other with respect to the vertical transmission angle; and the receiving angles include a vertical receiving angle parallel to the vertical transmission angle and at least two deflected receiving angles respectively parallel to the at least two deflected transmission angles. The coherent compounding includes extracting, from beamformed data corresponding to the vertical transmission angle, beamformed data corresponding to the at least two deflected transmission angles that are symmetrical to each other with respect to the vertical transmission angle, and performing coherent compounding on the beamformed data corresponding to the at least two deflected transmission angles, to obtain the coherently compounded data. The beamformed data corresponding to the deflected transmission angles that are symmetrical to each other with respect to the vertical transmission angle have better coherence, and a coherent compounding effect is better. The non-coherent compounding includes performing non-coherent compounding on at least one set of coherently compounded data that corresponds to the vertical transmission angle, and the beamformed data not subjected to the coherent compounding that corresponds to the vertical transmission angle and the vertical receiving angle.

For example, the transmission angles include a first transmission angle, a second transmission angle, a third transmission angle, a fourth transmission angle, and a fifth transmission angle, the third transmission angle is the vertical transmission angle, the first transmission angle and the fifth transmission angle are the deflected transmission angles that are symmetrical to each other with respect to the third transmission angle, and the second transmission angle and the fourth transmission angle are the deflected transmission angles that are symmetrical to each other with respect to the third transmission angle. Exemplarily, a transmitting frequency corresponding to the first transmission angle and the fifth transmission angle is a first transmitting frequency, a transmitting frequency corresponding to the second transmission angle and the fourth transmission angle is a second transmitting frequency, and a transmitting frequency corresponding to the third transmission angle is a third transmitting frequency.

Receiving angles corresponding to the first transmission angle include a first receiving angle, a second receiving angle, and a third receiving angle; receiving angles corresponding to the second transmission angle include the first receiving angle, the second receiving angle, the third receiving angle, and a fourth receiving angle; receiving angles corresponding to the third transmission angle include the first receiving angle, the second receiving angle, the third receiving angle, the fourth receiving angle, and a fifth receiving angle; receiving angles corresponding to the fourth transmission angle include the second receiving angle, the third receiving angle, the fourth receiving angle, and the fifth receiving angle; and receiving angles corresponding to the fifth transmission angle include the third receiving angle, the fourth receiving angle, and the fifth receiving angle. The third receiving angle is the vertical receiving angle, the first receiving angle and the fifth receiving angle are deflected receiving angles that are symmetrical to each other with respect to the third receiving angle, and the second receiving angle and the fourth receiving angle are deflected receiving angles that are symmetrical to each other with respect to the third receiving angle.

When transmission and receiving are performed based on the above transmitting and receiving strategy, coherent compounding is performed on beamformed data corresponding to the third transmission angle and the first receiving angle and beamformed data corresponding to the third transmission angle and the fifth receiving angle; and coherent compounding is performed on beamformed data corresponding to the third transmission angle and the second receiving angle and beamformed data corresponding to the third transmission angle and the fourth receiving angle, to obtain two sets of coherently compounded data corresponding to the third transmission angle.

In addition to the vertical transmission angle, coherent compounding may be further performed on beamformed data corresponding to at least two different receiving angles corresponding to at least one of the deflected transmission angles to obtain coherently compounded data corresponding to the at least one deflected transmission angle. Data for the non-coherent compounding further includes the coherently compounded data corresponding to the at least one deflected receiving angle. For example, coherent compounding may be performed on beamformed data corresponding to the second transmission angle and the second receiving angle and beamformed data corresponding to the second transmission angle and the fourth receiving angle, and coherent compounding may be performed on beamformed data corresponding to the fourth transmission angle and the second receiving angle and beamformed data corresponding to the fourth transmission angle and the fourth receiving angle. Non-coherent compounding may be performed on the obtained coherently compounded data and other beamformed data not subjected to the coherent compounding.

In the ultrasound imaging method 1300 of this embodiment of the disclosure, the coherent compounding is performed on the beamformed data corresponding to the same transmission angle, the same transmitting frequency, and the different receiving angles, non-coherent compounding is performed on the coherently compounded data and the beamformed data not subjected to the coherent compounding, the compounded image can include information about a plurality of frequencies without requiring exactly all transmitting frequencies to be used for transmission at each transmission angle, and a spatial resolution, a penetration capability, and a temporal resolution of the compounded image can be ensured without reducing a frame rate; in a compounding process, both coherent compounding and non-coherent compounding are performed, and phase information and amplitude information of data are combined; and coherent compounding is performed between data corresponding to the same transmission angle and the same transmitting frequency, which reduces the difficulty of a compounding algorithm. For more specific details of the ultrasound imaging method 1300, reference may be made to the related description of the ultrasound imaging method 500. Details are not described herein again.

An embodiment of the disclosure further provides an ultrasound imaging system, configured to implement the above ultrasound imaging method 500, ultrasound imaging method 1100, ultrasound imaging method 1200, or ultrasound imaging method 1300. Referring now to FIG. 1 again, the ultrasound imaging system may be implemented as the ultrasound imaging system 100 shown in FIG. 1. The ultrasound imaging system 100 may include an ultrasound probe 110, a transmitter circuit 112, a receiver circuit 114, a processor 116, and a display 118. Optionally, the ultrasound imaging system 100 may further include a transmitting/receiving selection switch 120 and a beamforming module 122, and the transmitter circuit 112 and the receiver circuit 114 may be connected to the ultrasound probe 110 through the transmitting/receiving selection switch 120. For the related description of the components, reference may be made to the related description above. Details are not described herein again.

The transmitter circuit 112 is configured to excite the ultrasound probe 110 to transmit an ultrasound wave to a target tissue. The receiver circuit 114 is configured to control the ultrasound probe 110 to receive an echo of the ultrasound wave, to obtain an ultrasound echo signal. The processor 116 is configured to perform the steps of the above ultrasound imaging method 500, ultrasound imaging method 1100, ultrasound imaging method 1200, or ultrasound imaging method 1300. The processor 116 is further configured to control the display 118 to display an ultrasound image.

The above describes only the main functions of the components of the ultrasound imaging system, and for more details, reference may be made to the related description of the ultrasound imaging method.

While example embodiments have been described herein with reference to the accompanying drawings, it should be understood that the above example embodiments are merely illustrative and are not intended to limit the scope of the disclosure thereto. Those of ordinary skill in the art may make various changes and modifications therein without departing from the scope and spirit of the disclosure. All such changes and modifications are intended to be included in the scope of the disclosure as claimed in the appended claims.

Those of ordinary skill in the art would have appreciated that the units and algorithm steps of the examples described in conjunction with the embodiments disclosed herein may be implemented in electronic hardware or a combination of computer software and electronic hardware. Whether the functions are performed by hardware or software depends on particular applications and design constraint conditions of the technical solutions. Those skilled in the art could use different methods to implement the described functions for each particular application, but such implementation should not be considered to be beyond the scope of the disclosure.

In several embodiments provided in the present disclosure, it is to be understood that the disclosed devices and methods may be implemented in other ways. For example, the device embodiments described above are merely exemplary. For example, the division of units is merely a logical function division. In actual implementations, there may be other division methods. For example, a plurality of units or assemblies may be combined or integrated into another device, or some features may be omitted or not implemented.

A large number of specific details are explained in this description provided herein. However, it can be understood that the embodiments of the disclosure can be practiced without these specific details. In some instances, well-known methods, structures, and technologies are not shown in detail, so as not to obscure the understanding of this description.

Similarly, it should be understood that in order to simplify the disclosure and help to understand one or more of various aspects of the disclosure, in the description of the exemplary embodiments of the disclosure, various features of the disclosure are sometimes together grouped into an individual embodiment, figure or description thereof. However, the method of the disclosure should not be construed as reflecting the following intention: namely, the disclosure set forth requires more features than those explicitly stated in each claim. More precisely, as reflected by the corresponding claims, the inventive point thereof lies in that features that are fewer than all the features of an individual embodiment disclosed may be used to solve the corresponding technical problem. Therefore, the claims in accordance with the particular embodiments are thereby explicitly incorporated into the particular embodiments, where each claim itself serves as an individual embodiment of the disclosure.

Those skilled in the art should understand that, in addition to the case where features are mutually exclusive, any combination may be used to combine all the features disclosed in this description (along with the appended claims, abstract, and drawings) and all the processes or units of any of methods or apparatuses as disclosed. Unless explicitly stated otherwise, each feature disclosed in this description (along with the appended claims, abstract, and drawings) may be replaced by an alternative feature that provides the same, equivalent, or similar objective.

Furthermore, those skilled in the art should understand that although some of the embodiments described herein include some but not other features included in other embodiments, combinations of features of different embodiments are meant to be within the scope of the disclosure, and form different embodiments. For example, in the claims, any one of the embodiments set forth thereby may be used in any combination.

Various embodiments regarding components in the disclosure may be implemented in hardware, or implemented by software modules running on one or more processors, or implemented in a combination thereof. It should be understood for those skilled in the art that a microprocessor or a digital signal processor (DSP) may be used in practice to implement some or all of the functions of some modules according to the embodiments of the disclosure. The disclosure may further be implemented as an apparatus program (e.g., a computer program and a computer program product) for executing some or all of the methods described herein. Such a program for implementing the disclosure may be stored on a computer-readable medium, or may be in the form of one or more signals. Such a signal may be downloaded from an Internet website, or provided on a carrier signal, or provided in any other form.

It should be noted that the description of the disclosure made in the above-mentioned embodiments is not to limit the disclosure, and those skilled in the art may design alternative embodiments without departing from the scope of the appended claims. In the claims, any reference signs placed between parentheses should not be construed as limitation on the claims. The disclosure may be implemented by means of hardware including several different elements and by means of an appropriately programmed computer. In unit claims listing several apparatuses, several of these apparatuses may be specifically embodied by one and the same item of hardware. The use of the terms "first", "second", "third", etc. does not indicate any order. These terms may be interpreted as names.

The above descriptions are merely the specific embodiments of the disclosure or the description of the specific embodiments, but the scope of protection of the disclosure is not limited thereto. Changes or substitutions which may be readily contemplated by those skilled in the art within the technical scope disclosed in the disclosure fall within the scope of protection of the disclosure. The scope of protection of the disclosure should be subject to the scope of protection of the claims.

What is claimed is:

1. An ultrasound imaging method, comprising:
   transmitting ultrasound waves to a target tissue of a subject at least three different transmission angles, wherein the ultrasound waves comprise first ultrasound waves at least two first transmission angles having different transmitting frequencies, and second ultrasound waves at least two second transmission angles having a same transmitting frequency;
   receiving an echo of each of the ultrasound waves at each transmission angle to obtain an ultrasound echo signal corresponding to each transmission angle;
   for the ultrasound echo signal corresponding to each transmission angle, performing beamforming at least two different receiving angles to obtain beamformed data corresponding to the different receiving angles;
   based on each transmission angle, receiving angles, and a transmitting frequency corresponding to the beamformed data, performing at least one coherent compounding and at least one non-coherent compounding on the beamformed data to obtain compounded data, wherein each coherent compounding comprises performing coherent compounding on beamformed data corresponding to a same receiving angle, the same transmitting frequency, and different transmission angles to obtain a set of coherently compounded data corresponding to the same receiving angle and the same transmitting frequency, and each non-coherent compounding comprises performing non-coherent compounding on at least one set of coherently compounded data and beamformed data not subjected to the coherent compounding; and
   generating an ultrasound image based on the compounded data.

2. The ultrasound imaging method of claim 1, wherein performing non-coherent compounding on at least one set of coherently compounded data and beamformed data not subjected to the coherent compounding comprises:
   performing non-coherent compounding on the coherently compounded data corresponding to each receiving angle and beamformed data not subjected to the coherent compounding corresponding to each receiving angle, to obtain non-coherently compounded data corresponding to each receiving angle; and performing non-coherent compounding on the non-coherently compounded data corresponding to different receiving angles to obtain the compounded data.

3. The ultrasound imaging method of claim 1, wherein performing non-coherent compounding on at least one set of coherently compounded data and beamformed data not subjected to the coherent compounding comprises:

performing non-coherent compounding on the coherently compounded data corresponding to a plurality of receiving angles and beamformed data not subjected to the coherent compounding corresponding to the plurality of receiving angles, to obtain the compounded data.

4. The ultrasound imaging method of claim 1, wherein the coherent compounding is performed at some or all of the receiving angles.

5. The ultrasound imaging method of claim 1, wherein the transmission angles comprise a vertical transmission angle perpendicular to a plane where an array element that transmits the ultrasound wave is located and at least two deflected transmission angles that are symmetrical to each other with respect to the vertical transmission angle, and the at least two deflected transmission angles that are symmetrical to each other with respect to a same vertical transmission angle have a same transmitting frequency;

wherein the receiving angles comprise a vertical receiving angle parallel to the vertical transmission angle and at least two deflected receiving angles respectively parallel to the at least two deflected transmission angles;

wherein the coherent compounding comprises performing coherent compounding on beamformed data corresponding to the same transmission angle, the same transmitting frequency, and receiving angles that are symmetrical to each other with respect to the vertical receiving angle; and wherein the beamformed data not subjected to the coherent compounding is beamformed data corresponding to the vertical transmission angle and the vertical receiving angle.

6. The ultrasound imaging method of claim 5, wherein the transmission angles comprise a first transmission angle, a second transmission angle, and a third transmission angle, the second transmission angle is the vertical transmission angle, and the first transmission angle and the third transmission angle are deflected transmission angles that are symmetrical to each other with respect to the first transmission angle;

a transmitting frequency corresponding to the first transmission angle and the third transmission angle is a first transmitting frequency, and a transmitting frequency corresponding to the second transmission angle is a second transmitting frequency;

receiving angles corresponding to the first transmission angle, the second transmission angle, and the third transmission angle respectively comprise a first receiving angle, a second receiving angle, and a third receiving angle, the second receiving angle is the vertical receiving angle, and the first receiving angle and the third receiving angle are respectively parallel to the first transmission angle and the third transmission angle;

performing coherent compounding on beamformed data corresponding to the same receiving angle, the same transmitting frequency, and different transmission angles to obtain a set of coherently compounded data corresponding to the same receiving angle and the same transmitting frequency comprises:

performing coherent compounding on beamformed data corresponding to the first transmission angle, the first transmitting frequency, and the first receiving angle, and beamformed data corresponding to the third transmission angle, the first transmitting frequency, and the first receiving angle, to obtain first coherently compounded data;

performing coherent compounding on beamformed data corresponding to the first transmission angle, the first transmitting frequency, and the second receiving angle, and beamformed data corresponding to the third transmission angle, the first transmitting frequency, and the second receiving angle, to obtain second coherently compounded data; and performing coherent compounding on beamformed data corresponding to the first transmission angle, the first transmitting frequency, and the third receiving angle, and beamformed data corresponding to the third transmission angle, the first transmitting frequency, and the third receiving angle, to obtain third coherently compounded data; and wherein the non-coherent compounding comprises performing the non-coherent compounding on the first coherently compounded data, the second coherently compounded data, the third coherently compounded data, beamformed data corresponding to the second transmission angle, the second transmitting frequency, and the first receiving angle, beamformed data corresponding to the second transmission angle, the second transmitting frequency, and the second receiving angle, and beamformed data corresponding to the second transmission angle, the second transmitting frequency, and the third receiving angle.

7. The ultrasound imaging method of claim 5, wherein the transmission angles comprise a first transmission angle, a second transmission angle, a third transmission angle, a fourth transmission angle, and a fifth transmission angle, the third transmission angle is the vertical transmission angle, the first transmission angle and the fifth transmission angle are deflected transmission angles that are symmetrical to each other with respect to the third transmission angle, and the second transmission angle and the fourth transmission angle are deflected transmission angles that are symmetrical to each other with respect to the third transmission angle;

a transmitting frequency corresponding to the first transmission angle and the fifth transmission angle is a first transmitting frequency, a transmitting frequency corresponding to the second transmission angle and the fourth transmission angle is a second transmitting frequency, and a transmitting frequency corresponding to the third transmission angle is a third transmitting frequency;

receiving angles corresponding to the first transmission angle comprise a first receiving angle, a second receiving angle, and a third receiving angle; receiving angles corresponding to the second transmission angle comprise the first receiving angle, the second receiving angle, the third receiving angle, and a fourth receiving angle; receiving angles corresponding to the third transmission angle comprise the first receiving angle, the second receiving angle, the third receiving angle, the fourth receiving angle, and a fifth receiving angle; receiving angles corresponding to the fourth transmission angle comprise the second receiving angle, the third receiving angle, the fourth receiving angle, and the fifth receiving angle; receiving angles corresponding to the fifth transmission angle comprise the second receiving angle, the third receiving angle, the fourth receiving angle, and the fifth receiving angle; and the third receiving angle is the vertical receiving angle, the first receiving angle and the fifth receiving angle are respectively parallel to the first transmission angle and the fifth transmission angle, and the second receiving angle and the fourth receiving angle are respectively parallel to the second transmission angle and the fourth transmission angle; and performing coherent compounding on beamformed data corresponding to the same receiving angle, the same transmitting frequency, and different transmission angles to obtain a set of coherently compounded data corresponding to the same receiving angle and the same transmitting frequency comprises:

performing coherent compounding on beamformed data corresponding to the second transmission angle, the second transmitting frequency, and the second receiving angle, and beamformed data corresponding to the fourth transmission angle, the second transmitting frequency, and the second receiving angle, to obtain fourth coherently compounded data;

performing coherent compounding on beamformed data corresponding to the first transmission angle, the first transmitting frequency, and the third receiving angle, and beamformed data corresponding to the fifth transmission angle, the first transmitting frequency, and the third receiving angle, to obtain fifth coherently compounded data;

performing coherent compounding on beamformed data corresponding to the second transmission angle, the second transmitting frequency, and the third receiving angle, and beamformed data corresponding to the fourth transmission angle, the second transmitting frequency, and the third receiving angle, to obtain sixth coherently compounded data; and performing coherent compounding on beamformed data corresponding to the second transmission angle, the second transmitting frequency, and the fourth receiving angle, and beamformed data corresponding to the fourth transmission angle, the second transmitting frequency, and the fourth receiving angle, to obtain seventh coherently compounded data; and wherein the non-coherent compounding comprises performing the non-coherent compounding on the fourth coherently compounded data, the fifth coherently compounded data, the sixth coherently compounded data, the seventh coherently compounded data, and the beamformed data not subjected to the coherent compounding.

8. The ultrasound imaging method of claim 1, wherein an included angle between each transmission angle and a corresponding receiving angle does not exceed a maximum included angle between a normal direction of an array element that transmits the ultrasound wave and the transmission angle.

9. The ultrasound imaging method of claim 1, wherein a number of different receiving angles among the receiving angles is the same as a number of different transmission angles among the transmission angles.

10. An ultrasound imaging method, comprising:

transmitting ultrasound waves to a target tissue of a subject at least two different transmission angles, wherein the ultrasound waves comprise first ultrasound waves at least two transmission angles having different transmitting frequencies;

receiving an echo of each of the ultrasound waves at each transmission angle to obtain an ultrasound echo signal corresponding to each transmission angle;

for the ultrasound echo signal corresponding to each transmission angle, performing beamforming at least two different receiving angles to obtain beamformed data corresponding to the different receiving angles;

based on each transmission angle, receiving angles, and a transmitting frequency corresponding to the beamformed data, performing at least one coherent compounding and at least one non-coherent compounding on the beamformed data to obtain compounded data, wherein each coherent compounding comprises performing coherent compounding on beamformed data corresponding to a same transmission angle, a same transmitting frequency, and different receiving angles to obtain a set of coherently compounded data corresponding to the same transmission angle and the same transmitting frequency, and each non-coherent compounding comprises performing non-coherent compounding on at least two sets of coherently compounded data; and generating an ultrasound image based on the compounded data.

11. The ultrasound imaging method of claim 10, wherein performing coherent compounding on beamformed data corresponding to a same transmission angle, a same transmitting frequency, and different receiving angles to obtain a set of coherently compounded data corresponding to the same transmission angle and the same transmitting frequency comprises:

performing coherent compounding on the beamformed data corresponding to the receiving angles for each transmission angle to obtain coherently compounded data corresponding to said transmission angle; and performing non-coherent compounding on at least two sets of coherently compounded data comprises: performing non-coherent compounding on the coherently compounded data corresponding to transmission angles to obtain the compounded data.

12. The ultrasound imaging method of claim 10, wherein the transmission angles comprise a vertical transmission angle perpendicular to a plane where an array element that transmits the ultrasound wave is located and at least two deflected transmission angles that are symmetrical to each other with respect to the vertical transmission angle; and the receiving angles comprise a vertical receiving angle parallel to the vertical transmission angle and at least two deflected receiving angles respectively parallel to the at least two deflected transmission angles.

13. The ultrasound imaging method of claim 12, wherein the at least two deflected transmission angles that are symmetrical to each other with respect to the vertical transmission angle correspond to the same transmitting frequency.

14. The ultrasound imaging method of claim 10, wherein an included angle between each transmission angle and a corresponding receiving angle does not exceed a maximum included angle between a normal direction of an array element that transmits the ultrasound wave and each transmission angle.

15. The ultrasound imaging method of claim 10, wherein a number of different receiving angles among the receiving angles is the same as a number of different transmission angles among transmission angles.

16. An ultrasound imaging method, comprising:
transmitting ultrasound waves to a target tissue of a subject at least two different transmission angles, wherein the ultrasound waves comprise first ultrasound waves at least two transmission angles having different transmitting frequencies;
receiving an echo of each of the ultrasound waves at each transmission angle to obtain an ultrasound echo signal corresponding to each transmission angle;
for the ultrasound echo signal corresponding to each transmission angle, performing beamforming at least two different receiving angles to obtain beamformed data corresponding to the different receiving angles;
based on each transmission angle, receiving angles, and a transmitting frequency corresponding to the beamformed data, performing at least one coherent compounding and at least one non-coherent compounding on the beamformed data to obtain compounded data, wherein each coherent compounding comprises performing coherent compounding on beamformed data corresponding to a same transmission angle, a same transmitting frequency, and different receiving angles to obtain a set of coherently compounded data corresponding to the same transmission angle and the same transmitting frequency, and each non-coherent compounding comprises performing non-coherent compounding on at least one set of coherently compounded data and beamformed data not subjected to the coherent compounding; and
generating an ultrasound image based on the compounded data.

17. The ultrasound imaging method of claim 16, wherein the transmission angles comprise a vertical transmission angle perpendicular to a plane where an array element that transmits the ultrasound wave is located and at least two deflected transmission angles that are symmetrical to each other with respect to the vertical transmission angle; and the receiving angles comprise a vertical receiving angle parallel to the vertical transmission angle and at least two deflected receiving angles respectively parallel to the at least two deflected transmission angles;
performing coherent compounding on beamformed data corresponding to the same transmission angle, the same transmitting frequency, and different receiving angles to obtain a set of coherently compounded data corresponding to the same transmission angle and the same transmitting frequency comprises:
extracting, from beamformed data corresponding to the vertical transmission angle, beamformed data corresponding to the at least two deflected transmission angles that are symmetrical to each other with respect to the vertical transmission angle, and performing coherent compounding on the beamformed data corresponding to the at least two deflected transmission angles, to obtain the coherently compounded data; and
wherein the non-coherent compounding comprises performing non-coherent compounding on at least one set of coherently compounded data that corresponds to the vertical transmission angle, and the beamformed data not subjected to the coherent compounding that corresponds to the vertical transmission angle and the vertical receiving angle.

18. The ultrasound imaging method of claim 17, further comprising:
performing coherent compounding on beamformed data corresponding to at least two different receiving angles corresponding to at least one of the at least two deflected transmission angles to obtain coherently compounded data corresponding to the at least one deflected transmission angle; and
data for the non-coherent compounding further comprises the coherently compounded data corresponding to the at least one deflected receiving angle.

* * * * *